(12) United States Patent
Batson et al.

(10) Patent No.: US 8,368,346 B2
(45) Date of Patent: Feb. 5, 2013

(54) PORTABLE ENERGY STORAGE AND CHARGING DEVICE

(75) Inventors: David C. Batson, Winchester, MA (US); Leslie J. Pinnell, Framingham, MA (US)

(73) Assignee: The Gillette Company, Boston, MA (US)

( * ) Notice: Subject to any disclaimer, the term of this patent is extended or adjusted under 35 U.S.C. 154(b) by 909 days.

(21) Appl. No.: 11/775,995

(22) Filed: Jul. 11, 2007

(65) Prior Publication Data

US 2008/0238356 A1 Oct. 2, 2008

Related U.S. Application Data

(60) Provisional application No. 60/908,016, filed on Mar. 26, 2007.

(51) Int. Cl.
*H02J 7/00* (2006.01)
(52) U.S. Cl. .......................... 320/103; 320/137
(58) Field of Classification Search ................ 320/103, 320/155
See application file for complete search history.

(56) References Cited

U.S. PATENT DOCUMENTS

| | | | |
|---|---|---|---|
| 5,670,862 A | 9/1997 | Lewyn | |
| 6,087,810 A | 7/2000 | Yoshida | |
| 6,118,250 A * | 9/2000 | Hutchison et al. | ............ 320/110 |
| 6,127,804 A | 10/2000 | Oglesbee et al. | |
| 6,534,953 B2 | 3/2003 | Shirakawa | |
| 6,534,954 B1 | 3/2003 | Plett | |
| 7,071,653 B2 | 7/2006 | Suzuki et al. | |
| D532,372 S | 11/2006 | Keating | |
| D532,745 S | 11/2006 | Gaber et al. | |
| 7,227,336 B1 | 6/2007 | van Schalkwijk et al. | |
| 2004/0113587 A1* | 6/2004 | Bohne et al. | ................... 320/128 |
| 2004/0160216 A1* | 8/2004 | Speranza et al. | ............... 320/140 |
| 2004/0195996 A1* | 10/2004 | Nishida | .......................... 320/103 |
| 2004/0234865 A1 | 11/2004 | Sato et al. | |
| 2005/0057225 A1 | 3/2005 | Marquet | |

(Continued)

FOREIGN PATENT DOCUMENTS

| | | |
|---|---|---|
| JP | 2006012613 A | 1/2006 |
| WO | WO 01/22696 | 3/2001 |

(Continued)

OTHER PUBLICATIONS

DuPasquier et al., "Power-ion battery: bridging the gap between Li-ion and supercapacitor chemistries", Journal of Power Sources, vol. 136, pp. 160-170, 2004.

(Continued)

*Primary Examiner* — Arun Williams
(74) *Attorney, Agent, or Firm* — Kevin C. Johnson; Steven W. Miller

(57) ABSTRACT

Disclosed is a portable charger device that includes a chamber to hold at least one rechargeable charging battery, and at least one controller. The controller is configured to determine a first charging current level to apply to the at least one rechargeable charging battery such that the at least one rechargeable charging battery achieves a first predetermined charge that is reached within a first period of time of 15 minutes or less, apply to the at least one rechargeable charging battery a first charging current substantially equal to the determined first charging current level, determine a second charging current to apply to the one or more external rechargeable batteries, and apply to the one or more external rechargeable batteries a second charging current substantially equal to the determined second charging current level, the second charging current being drawn from the at least one rechargeable charging battery.

29 Claims, 14 Drawing Sheets

U.S. PATENT DOCUMENTS

| | | | |
|---|---|---|---|
| 2005/0194934 A1 | 9/2005 | Iijima et al. | |
| 2005/0233218 A1 | 10/2005 | Ogawa et al. | |
| 2005/0244716 A1 | 11/2005 | Ogawa et al. | |
| 2006/0061330 A1* | 3/2006 | Sato et al. ................. | 320/125 |
| 2006/0164035 A1 | 7/2006 | Van Beek et al. | |
| 2006/0197496 A1 | 9/2006 | Iijima et al. | |
| 2006/0208695 A1 | 9/2006 | Weinstein et al. | |
| 2007/0037049 A1 | 2/2007 | Iijima et al. | |
| 2007/0063669 A1 | 3/2007 | Keating | |
| 2007/0075682 A1 | 4/2007 | Guang et al. | |
| 2008/0007215 A1* | 1/2008 | Hsieh ........................ | 320/114 |
| 2008/0106232 A1* | 5/2008 | Idzik et al. ................ | 320/103 |
| 2008/0238370 A1* | 10/2008 | Carrier et al. ............. | 320/134 |

FOREIGN PATENT DOCUMENTS

| | | | |
|---|---|---|---|
| WO | WO 2006097586 A1 | 9/2006 | |
| WO | WO 2007017164 A2 | 2/2007 | |
| WO | WO 2007017165 A2 | 2/2007 | |

OTHER PUBLICATIONS

US Patent Application "Adaptive Charger Device and Method" U.S. Appl. No. 11/775,987, filed Jul. 11, 2007 Leslie J. Pinnell et al.

US Patent Application "Ultra Fast Battery Charger with Battery Sensing" U.S. Appl. No. 11/776,261, filed Jul. 11, 2007 Jordan T. Bourilkov et al.

US Patent Application "Lithium Iron Phosphate Ultra Fast Battery Charger" U.S. Appl. No. 11/775,966, filed Jul. 11, 2007 Jordan T. Bourilkov et al.

US Patent Application "Fast Battery Charger Device and Method" U.S. Appl. No. 11/776,021, filed, Jul. 11, 2007 Leslie J. Pinnell et al.

US Patent Application "Battery Charger with Mechanism to Automatically Load and Unload Batteries" U.S. Appl. No. 11/775,979, filed Jul. 11, 2007 Matthew R. Stone et al.

US Patent Application "Single Electrochemical Cell with Integrated Voltage Converter Module" U.S. Appl. No. 11/776,350, filed, Jul. 11, 2007 George Cintra et al.

* cited by examiner

PORTABLE ENERGY STORAGE AND CHARGING DEVICE

CROSS-REFERENCE TO RELATED APPLICATIONS

This application claims priority to U.S. Provisional Application Ser. No. 60/908,016, entitled "Portable Energy Storage and Remote Charging Device" and filed on Mar. 26, 2007, the content of which is hereby incorporated by reference in its entirety.

BACKGROUND

The run-times of portable devices (e.g., cell phones, PDA's, etc.) are limited by the size of the battery packs used to power these devices. Generally, the battery packs are recharged by connecting the batteries and/or the devices to chargers that receive power from external AC or DC power sources.

When a user travels, and does not have access to the typical external power sources used to recharge the battery packs powering the user's various portable devices, the user is generally required to carry extra batteries for each portable device he has to extend the use time of those devices.

SUMMARY

Disclosed is a charger device that can store and deliver energy at high currents to portable applications, and in particular deliver energy at high currents to charge batteries of portable devices without accessing external AC or DC power sources. This device enables users of portable equipment and devices (e.g., PDA, Cellular telephone, portable lighting, video recorders, cameras, computers, etc.), to carry additional stored energy to extend device use time or for emergency use. The storage device can be charged from either AC sources or from a DC source such as a 14V DC sources commonly available in automobiles.

In one aspect, a portable charger device to charge one or more external rechargeable batteries is disclosed. The device includes a chamber to hold at least one rechargeable charging battery, and at least one controller. The controller is configured to determine a first charging current level to apply to the at least one rechargeable charging battery such that the at least one rechargeable charging battery achieves a first pre-determined charge that is reached within a first period of time of 15 minutes or less, apply to the at least one rechargeable charging battery a first charging current substantially equal to the determined first charging current level, determine a second charging current to apply to the one or more external rechargeable batteries, and apply to the one or more external rechargeable batteries a second charging current substantially equal to the determined second charging current level, the second charging current being drawn from the at least one rechargeable charging battery.

Embodiments may include one or more of the following.

The at least one controller may further be configured to periodically adjust the first charging current after a first pro-determined voltage level of the at least one rechargeable charging battery is reached to maintain the voltage at the terminals of the at least one rechargeable charging battery at the first predetermined voltage level.

The at least one controller may further be configured to periodically adjust the second charging current after a second predetermined voltage level of the at the one or more external rechargeable batteries is reached to maintain the voltage at the terminals of the one or more external rechargeable batteries at the second predetermined voltage level.

The at least one controller may be configured to determine the second charging current to apply to the one or more external rechargeable batteries such that the one or more external rechargeable batteries achieves a second predetermined charge level that is reached within a second period of time of 15 minutes or less.

The device may further include a power conversion module configured to convert an external power supply voltage level to a charging voltage level to be applied to the at least one rechargeable charging battery. The power conversion module may include, for example, an AC-DC power conversion module and/or a DC input PC-DC power conversion module. The device may further include a first housing containing the power conversion module, and an attachable second housing containing the at least one controller and the at least one rechargeable charging battery, the attachable second housing configured to be mechanically attached to the first housing.

The at least one rechargeable charging battery may include at least two rechargeable charging batteries, the at least two rechargeable charging batteries may be connected in a series configuration.

The at least one rechargeable charging battery may include Li-Ion batteries. The at least one rechargeable battery may include a Lithium-Iron-Phosphate battery.

The first pre-determined charge level of the at least one rechargeable charging battery may be at least 90% of the charge capacity of the at least one rechargeable charging battery, and the first period of time may be approximately between 5-15 minutes.

The second predetermined charge level of the one or more external rechargeable batteries may be at least 90% of the charge capacity of the one or more external rechargeable batteries, and the second period of time may be approximately between 5-15 minutes.

The device may further include a charging compartment configured to receive the one or more external rechargeable batteries. The device may further include the one or more external rechargeable batteries.

The at least one controller may include a processor-based micro-controller.

The device may further include the at least one rechargeable charging battery.

In another aspect, a portable charger device to charge one or more external rechargeable batteries is disclosed. The device includes a first housing having a chamber to hold at least one rechargeable charging battery, a second housing containing a first DC-DC conversion module that receives charge from the at least one rechargeable charging battery in the chamber and delivers charge to one or more external rechargeable batteries, and a third housing having a mechanism to attach and detach the third housing from the first housing, the third housing containing a second DC-DC conversion module that provides power to charge the at least one rechargeable charging battery and which receives charge from a power conversion module.

Embodiments may include one or more of the following.

The first housing may include a mechanism to attach and detach the first housing from the second housing.

The second housing may include a mechanism to attach and detach the second housing from the first housing.

The device may further include a fourth housing having a mechanism to attach and detach the fourth housing from the third housing, the fourth housing containing a power conversion module.

The device may further include the one or more external rechargeable batteries.

The first DC-DC conversion module may include at least one controller configured to determine a charging current level to apply to the one or more external rechargeable batteries, and apply to the one or more external rechargeable batteries a charging current substantially equal to the determined second charging current level the second charging current being drawn from the at least one rechargeable charging batteries. The at least one controller may be configured to determine the charging current to apply to the one or more external rechargeable batteries such that the one or more external rechargeable batteries achieves a charge level of at least 90% of the charge capacity of the one or more external rechargeable batteries within a period of time of 15 minutes or less. The at least one controller may further be configured to determine a second charging current level to apply to the at least one rechargeable charging battery such that the at least one rechargeable charging battery achieves a second charge level of at least 90% of the charge capacity of the at least one rechargeable charging battery within a second period of time of 15 minutes or less, and apply to the at least one rechargeable charging battery a second charging current substantially equal to the determined second charging current level.

The first housing and the second housing may be the same housing.

The second housing may further include an interface to couple to the one or more external batteries. The interface may be a harness interface.

The device may further include the at least one rechargeable charging battery.

In a further aspect, a method is disclosed. The method includes determining a first charging current level to apply to at least one rechargeable charging battery such that the at least one rechargeable charging battery achieves a first pre-determined charge that is reached within a first period of time of 15 minutes or less, applying to the at least one rechargeable charging battery a first charging current substantially equal to the determined first charging current level, determining a second charging current to apply to one or more external rechargeable batteries, and applying to the one or more external rechargeable batteries a second charging current substantially equal to the determined second charging current level, the second charging current being drawn from the at least one rechargeable charging battery.

Like the device aspects, embodiments of the method may include any feature corresponding to any of the features as set forth above for the devices.

The charger device can store a larger amount of energy than a typical portable device would normally have, thus enabling the user to transfer electrical charge from the charger device to the user's portable device or the portable device's battery. Thus, the user may carry stored electrical energy without having to carry extra batteries for every portable device the user has. The charger device serves as a portable universal charging device. The device additionally may have the capability to be recharged at high rates so that the portable energy storage device can be replenished with electrical energy in approximately 5-15 minutes or less. Further, the device can deliver high levels of charging power at high enough voltage to allow fast charging of smaller user portable device batteries in approximately 5-15 minutes, or less.

The charger device described herein provides a lightweight, low cost solution for carrying additional portable energy storage, enabling the extended use of various portable devices when the user is away from a reliable source of continuous power for extended periods of time.

The details of one or more embodiments of the invention are set forth in the accompanying drawings and the description below. Other features, objects, and advantages of the invention will be apparent from the description and drawings, and from the claims.

DETAILED DESCRIPTION

Figure 1:
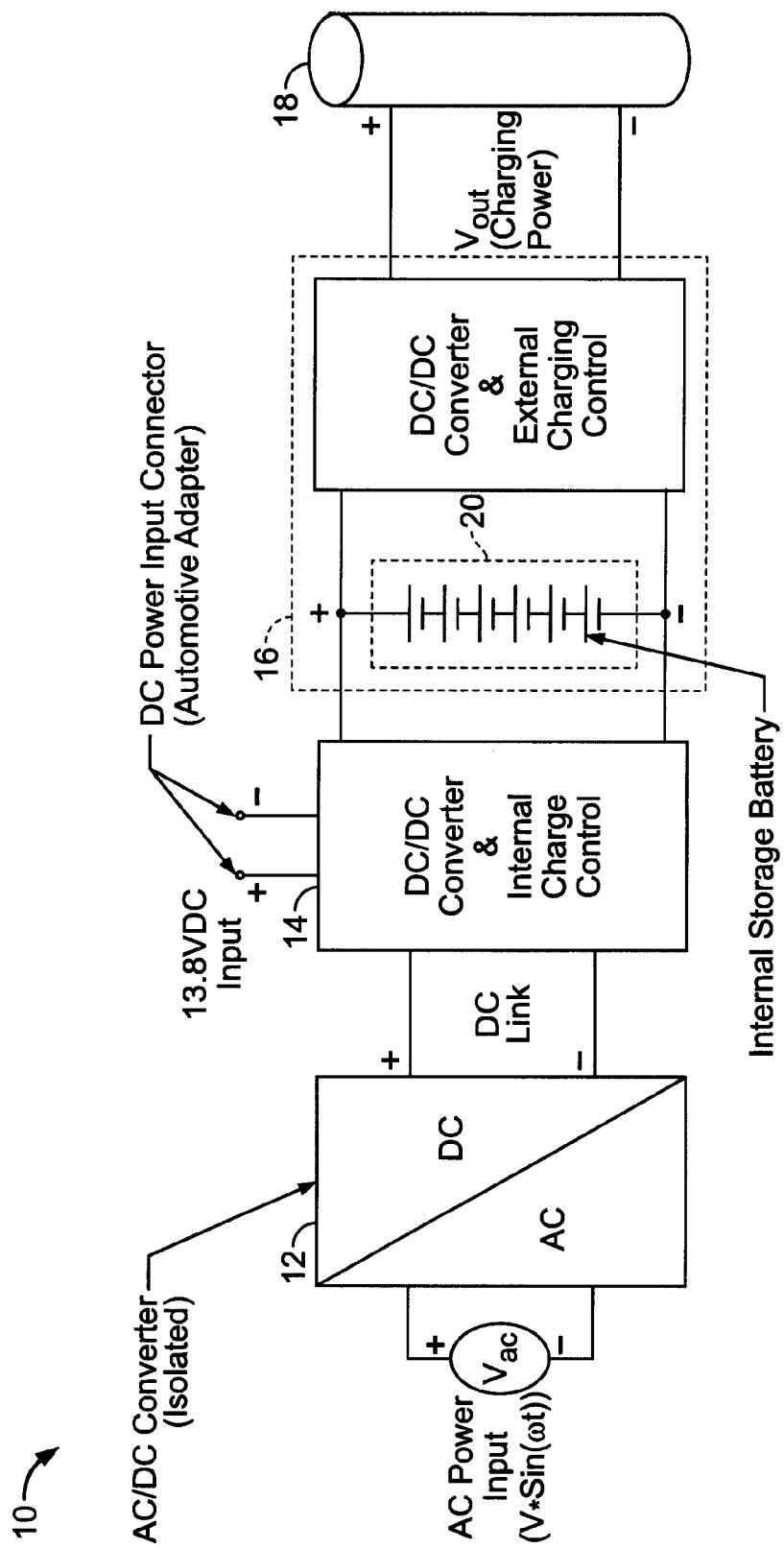
FIG. 1 is a block diagram of an exemplary embodiment of a portable charger device.

Referring to FIG. 1, a portable charger device 10 configured to recharge external batteries is shown. The portable charging device 10 uses current drawn from charging batteries 20 (also referred to as internal batteries) included with the portable charger device. The portable charger device 10 includes an AC-DC power conversion module 12 connected to DC input DC-DC power conversion module 14, which, in turn, is connected to a power storage and charging module 16. A battery 18 is coupled to the power storage and charging module 16. The battery 18 is typically a battery used in a portable electronic device. The AC-DC power conversion module 12 includes circuitry to convert current/voltage delivered from an external AC source to a lower level DC current/voltage suitable to charge the batteries. The DC input DC-DC power conversion module 14 includes circuitry to convert current/voltage delivered from an external DC source (e.g., a car's battery) to a lower level DC voltage suitable to charge batteries. The power storage and charging module 16 is configured to charge the external batteries using current drawn from internal batteries 20, and includes control circuitry and the internal batteries 20. While the internal batteries 20 shown in FIG. 1 include five (5) batteries arranged in series, fewer or more batteries, arranged in different configurations (e.g., parallel and or series and parallel) may be used.

The external battery 18, as well as the internal batteries 20 included with the power storage module 16, may be secondary cells (batteries) or primary cells. Primary electrochemical cells are meant to be discharged, e.g., to exhaustion, only once, and then discarded. Primary cells are not intended to be recharged. Primary cells are described, for example, in David Linden, Handbook of Batteries (McGraw-Hill, 2d ed. 1995). Secondary electrochemical cells can be recharged for many times, e.g., more than fifty times, more than a hundred times, or more. In some cases, secondary cells can include relatively robust separators, such as those having many layers and/or that are relatively thick. Secondary cells can also be designed to accommodate for changes, such as swelling, that can occur in the cells. Secondary cells are described, e.g., in Falk & Salkind, "Alkaline Storage Batteries", John Wiley & Sons, Inc. 1969; U.S. Pat. No. 345,124; and French Patent No. 164,681, all hereby incorporated by reference.

In the embodiments described herein, the external battery 18, as well as the internal batteries 20, are secondary, or rechargeable batteries, and may include Li-ion cells having graphitic anode material or lithium titanate anode material, and lithiated-iron-phosphate cathode materials adapted to enable fast recharge of rechargeable batteries based on such materials. The portable charger device 10 may be configured to charge different types of batteries, including, for example, cylindrical batteries, prismatic batteries, button-cell batteries, and so forth. Although FIG. 1 shows a single external battery 18 coupled to the charger 10, the charger 10 may be configured to be coupled and to charge additional external batteries such as battery 18. Other battery types may be used.

Figure 2A:
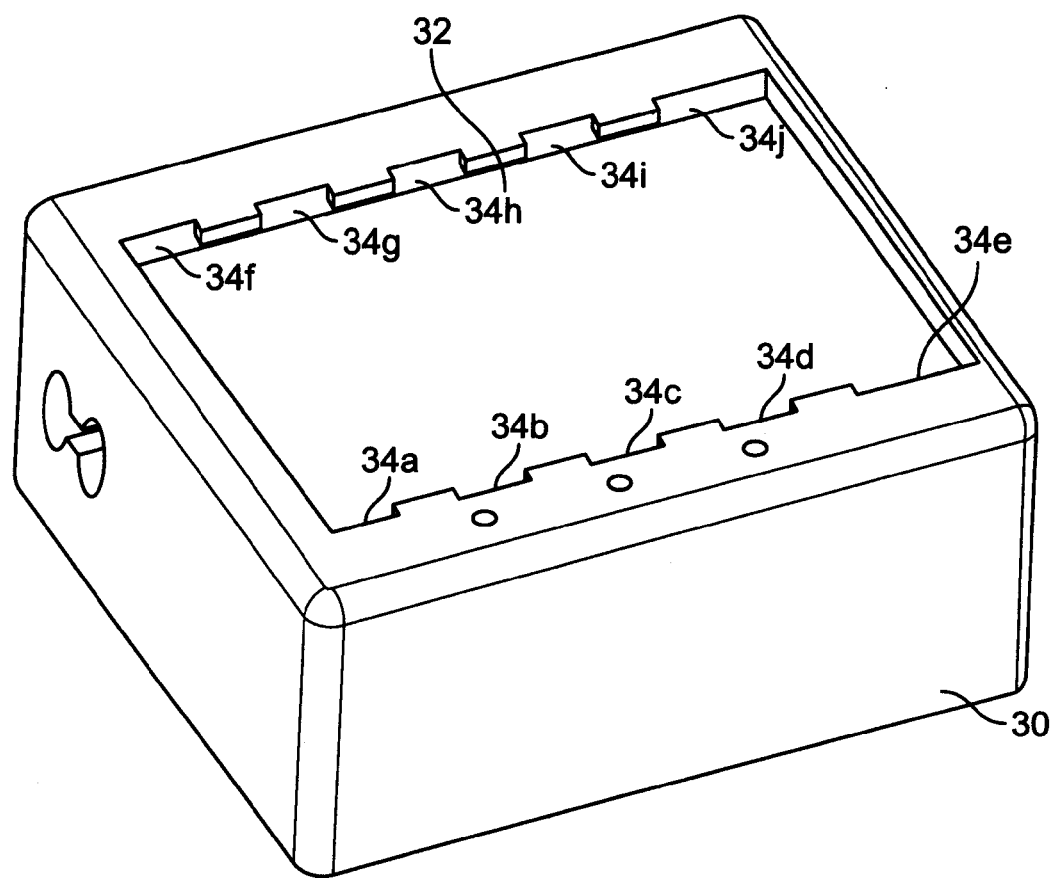
FIG. 2A is a perspective view of an exemplary embodiment of a housing containing power conversion circuitry.

Referring now to FIG. 2A, the AC-DC power conversion module 12 and DC input DC-DC power conversion module 14 are disposed in a power conversion housing 30 that is attachable and detachable from a separate attachable/detachable power storage and charging housing 40 (see FIG. 2B) from the power storage and charging module 16. Each of the AC-DC power conversion module 12 and the DC input DC-DC power conversion module 14 may be housed in discrete attachable housings, each having respective mechanisms to attach and detach to the other housing, so that in circumstances where only one of the power conversion modules is required (e.g., when the available external power source is a car's battery, only the DC input DC-DC power conversion module is required), the other power conversion housing would not have to be carried around.

Figure 2B:
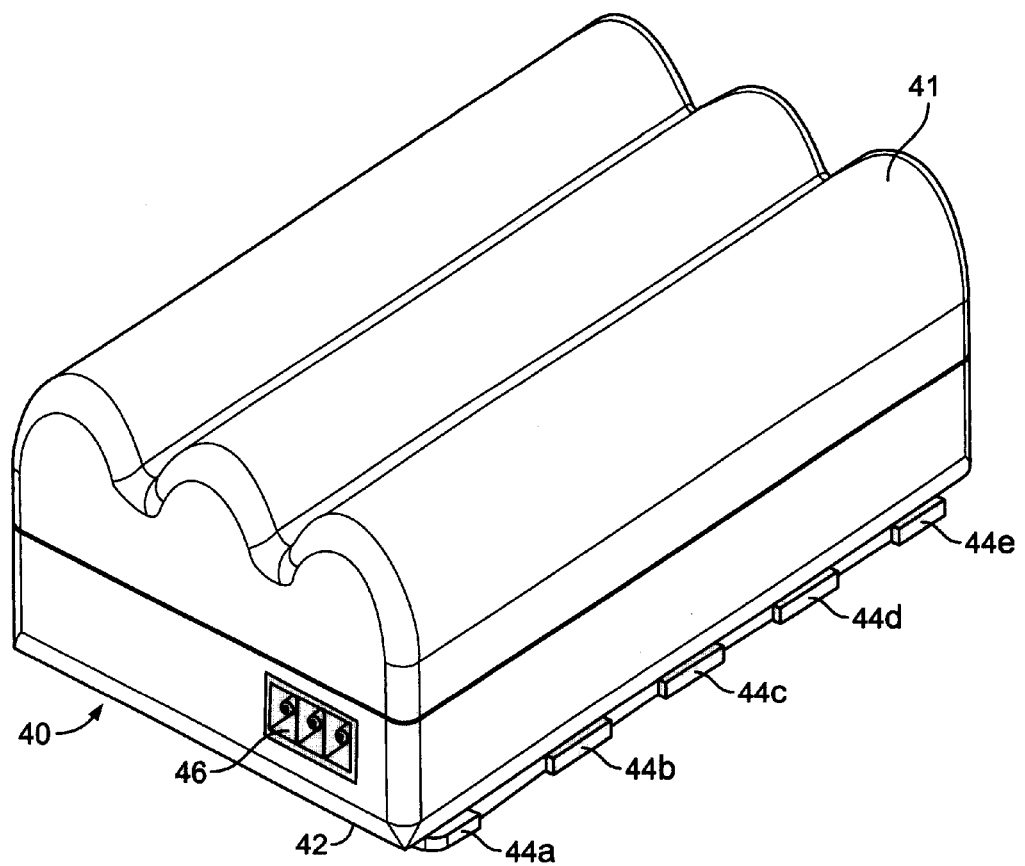
FIG. 2B is a perspective view of an exemplary embodiment of a housing containing power storage and charging circuitry.

Referring to FIG. 2B, the storage housing 40 includes a cover 41 and a base wall 42 that define an inner battery chamber in which the internal rechargeable batteries are received.

Figure 2C:
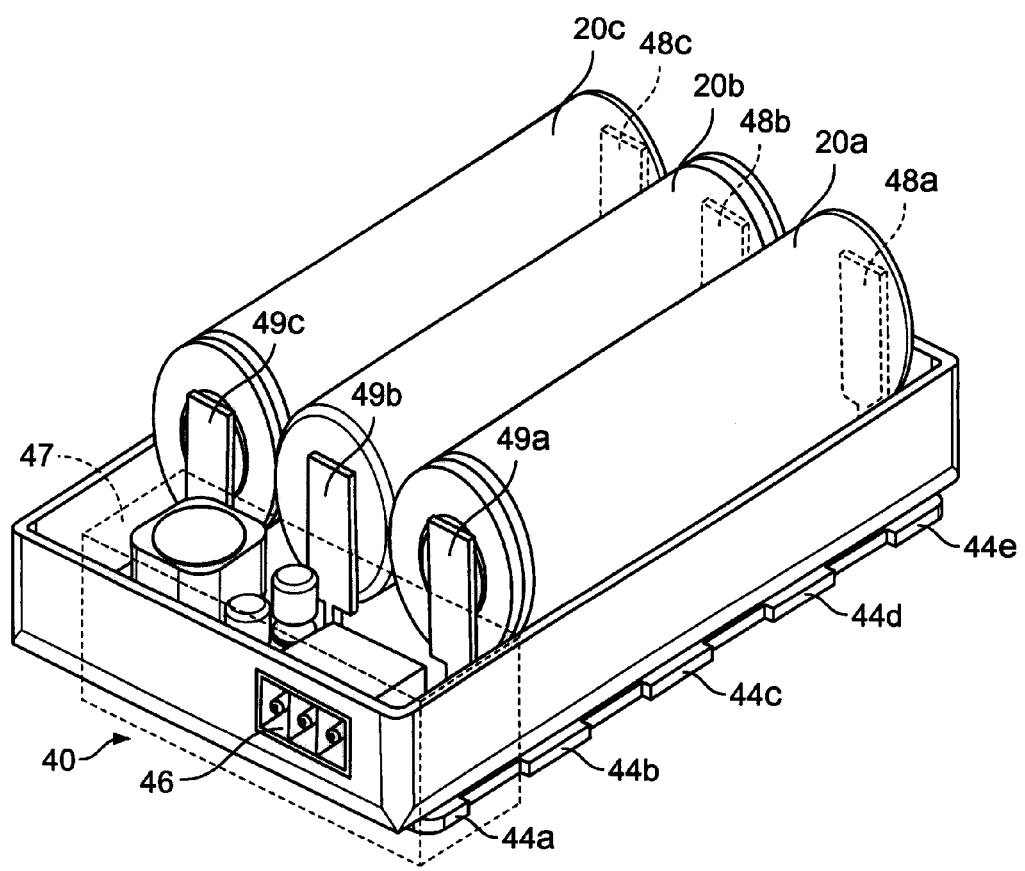
FIG. 2C is a perspective view of an exemplary embodiment of the internal view of the housing of FIG. 2B.

Referring to FIG. 2C, with the cover 41 of the housing 40 removed, the internal batteries 20a-c are electrically connected to each other through electrical terminals 48a-c (shown in phantom) and 49a-c. Not shown in FIG. 2C are conductors that couple terminals 48a-c and 49a-c in a predefined configuration to the output of the battery pack. For instance, the terminals of the housing 40, including the terminals 48a-c and 49a-c, are electrically connected so that, in some embodiments, a series configuration is formed. Other configurations are possible.

Also disposed inside the housing 40 is the control circuitry 47 that controls, as will be described in greater detail below, the charging process of the external battery 18 and/or the charging process of the internal batteries 20. In some embodiment, the control circuitry to control the charging process of the external battery 18 and/or the internal batteries 20a-c may be disposed in a housing, separate from the housing 40. Such a separate housing may include a mechanism to attach and detach the separate housing to the housing 40. Under these circumstance, the housing 40 would also include a mechanism to mechanically attach and detach the housing 40 from the separate housing containing the control circuitry. Thus, by having a separate housing to house, for example, the control circuitry to charge the external battery, the internal batteries 20 can be electrically coupled to multiple types of control circuitries that are configured to control the charging process of multiple types of external rechargeable batteries.

Figure 2D:
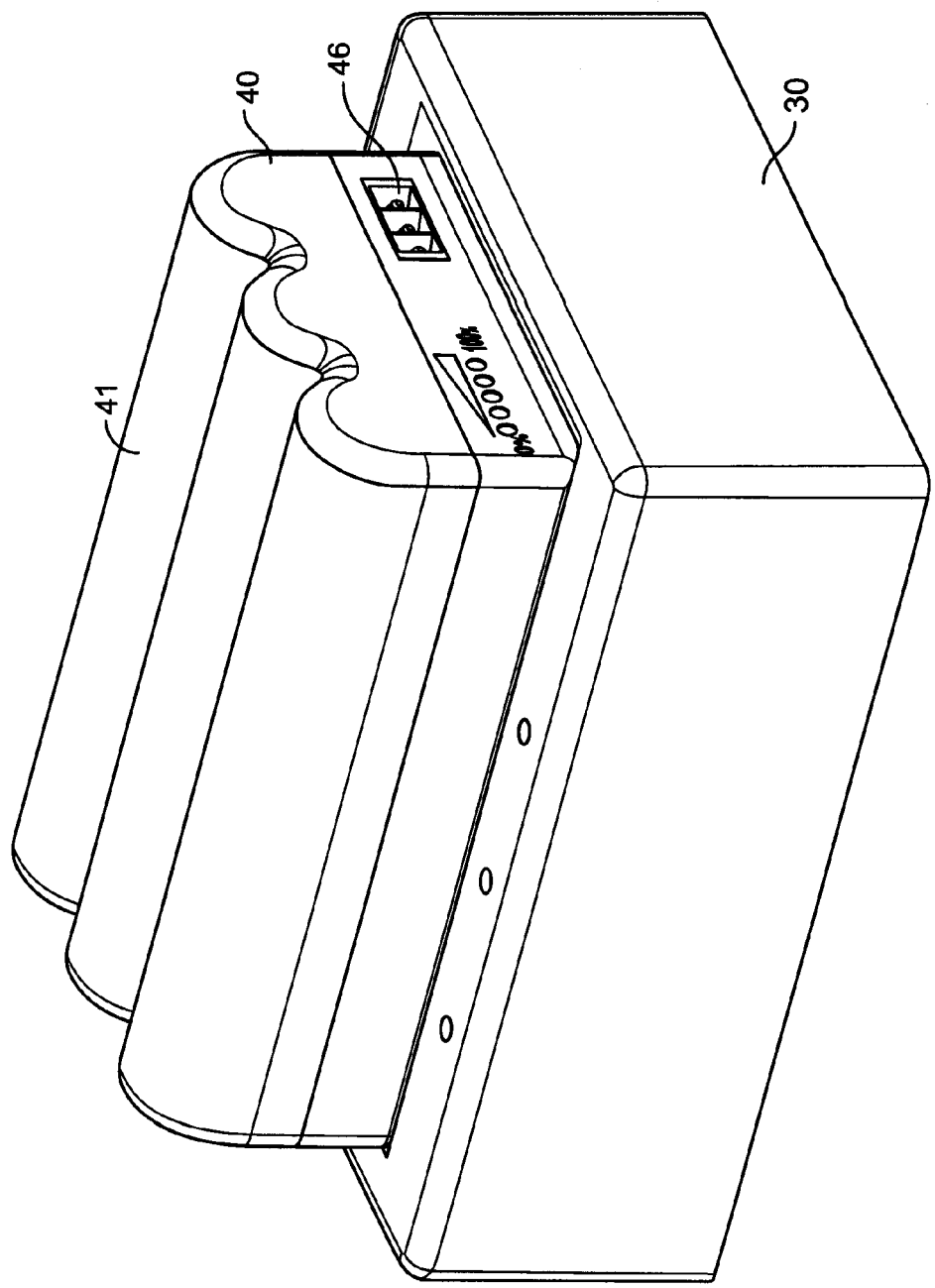
FIG. 2D is a perspective view of the housing of FIG. 2B mechanically attached to the housing of FIG. 2A.

As shown in FIGS. 2B-C, extending from one edge of a base wall 42 of the power storage and charging housing 40 (hereinafter "storage housing 40") are latching tabs 44a-e (a similar set of latching tabs also extends from the opposite edge of the base wall 42.) These latching tabs 44a-e are configured to be received in corresponding slots 34a-e defined on the longitudinal walls of the walls forming the depression 32 of the power conversion housing 30 (shown in FIG. 2A). When the latching tabs 44a-e are fitted inside the slots 34a-e, and when similar latching tabs are fitted in the slots 34f-j, the storage housing 40 is mechanically attached to the power conversion housing 30. FIG. 2D shows the storage housing 40 mechanically attached to the power conversion housing 30. The storage housing 40 may be attached to the power conversion housing 30 using other types of attachment mechanisms.

The latching tabs 44a-e are constructed from electrically conductive materials such that when the storage housing 40 is mechanically attached to the power conversion housing, the power storage module 16 is in electrical communication with the power conversion modules (i.e., the module 12 and/or the module 14 disposed in the housing 30) so that when the power conversion modules are connected to an external power source, it provides the charging current required to cause the internal charging batteries 20 to recharge, as will be described in greater details below.

The storage housing 40 includes an interface to enable mechanical and electrical coupling to one or more external rechargeable batteries, such as the external battery 18. For example, as shown in FIG. 2B, in some embodiments, the storage housing 40 includes a harness interface 46 having a 3-pin connector. The three pin harness interface enables the portable charging device to connect to different battery-operable user devices, such as cell phone, GPS transponder, etc, via a cable configured with the device's standard charging connector. This way, one portable charging device may be configured to charge a wide variety of user devices, without removing, the user device's battery, by connecting a variety of cable assemblies, having the appropriate device connector on one end and a mating three pin connector on the opposite end which mates with the harness connector 46.

When the external rechargeable battery 18 is placed inside the charging compartment and thus has its terminals in electrical communication with the charging circuitry of the power storage module 16, the external battery 18 is recharged through the application of a charging current, generally drawn from the internal charging batteries 20 of the power storage and charging module 16. During the charging process of the external rechargeable battery 18, the power conversion modules 12 and/or 14 do not have to be operating (although they may), and thus are not required to be present. Accordingly, when the external battery 18 is charged, the power conversion housing 30 can be detached from the power storage housing 40. In some embodiments, the charging current may be provided by the external power source connected to the power conversion modules 12 and/or 14.

By configuring the charger device 10 to have separate discrete attachable structures, the various attachable structures can be more easily earned around, and, therefore, are less physically burdensome to users. Further, a traveling user needs to only carry with him/her the storage housing 40 in which the power storage and charging module 16 (including the internal charging batteries) are disposed, and use the energy stored in the internal batteries to recharge external batteries that are used to power various electrical devices the user has.

Figure 2E:
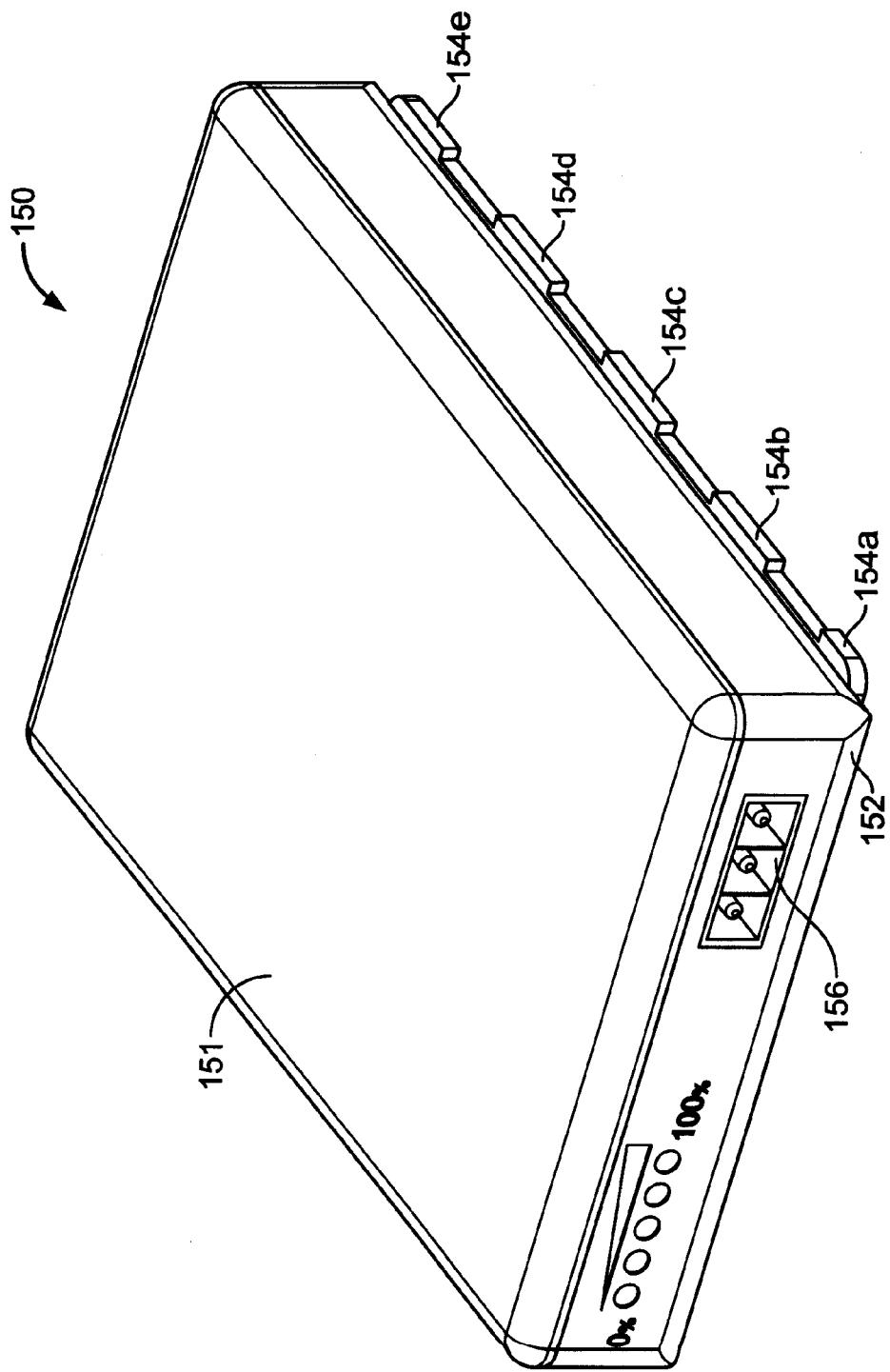
FIG. 2E is a perspective view of an exemplary embodiment of a housing to receive a prismatic internal battery, and containing a power storage and charging circuitry.

Referring to FIG. 2E, an embodiment of a storage housing 150 that uses one or more rechargeable prismatic batteries as its internal rechargeable batteries is shown. The storage housing 150 includes a cover 151 and a base wall 152 that define an inner battery chamber in which the one or more internal rechargeable prismatic batteries are received.

Figure 2F:
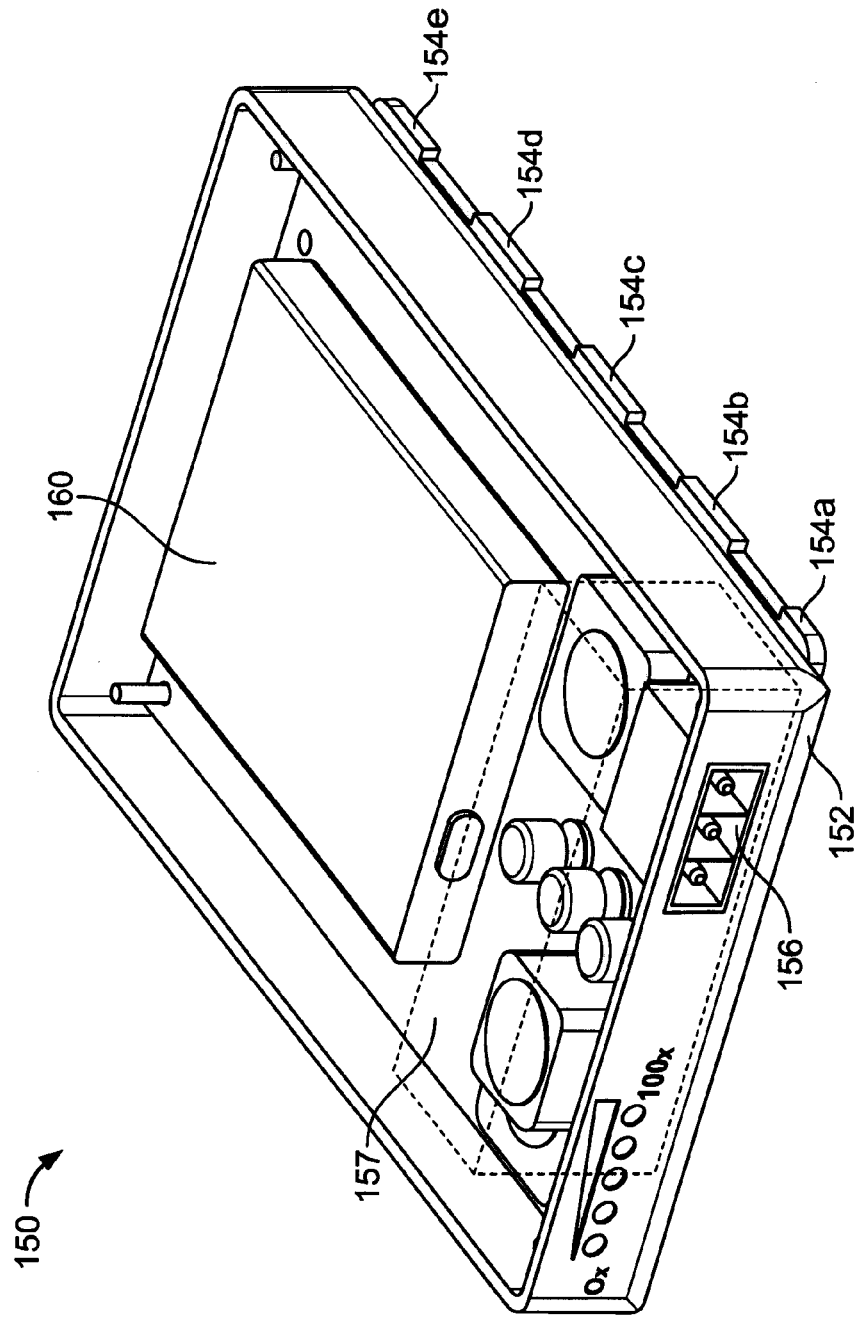
FIG. 2F is a perspective view of an exemplary embodiment of the internal view of the housing of FIG. 2E.

Referring to FIG. 2F, with the cover 151 of the housing 150 removed, an internal rechargeable prismatic battery 160 is disposed inside the inner battery chamber. Also disposed inside the housing 150 is the control circuitry 157 that, like the control circuitry 47 shown in FIG. 2C, controls the charging process of the external battery 18 and/or the charging process of the internal battery 160.

As further shown in FIGS. 2E-F, extending from one edge of a base wall 152 of the power storage and charging housing 150 are latching tabs 154a-e (a similar set of latching tabs also extends from the opposite edge of the base wall 152.) These latching tabs 154a-e are configured to be received in corresponding slots in a power conversion housing such as, for example, the power conversion housing 30 (shown in FIG. 2A). When the latching tabs 154a-e are fitted inside the corresponding slots of the power conversion housing, the storage housing 150 is mechanically attached to the power conversion housing. The storage housing 150 may be attached to the power conversion housing using other types of attachment mechanisms.

Figure 3:
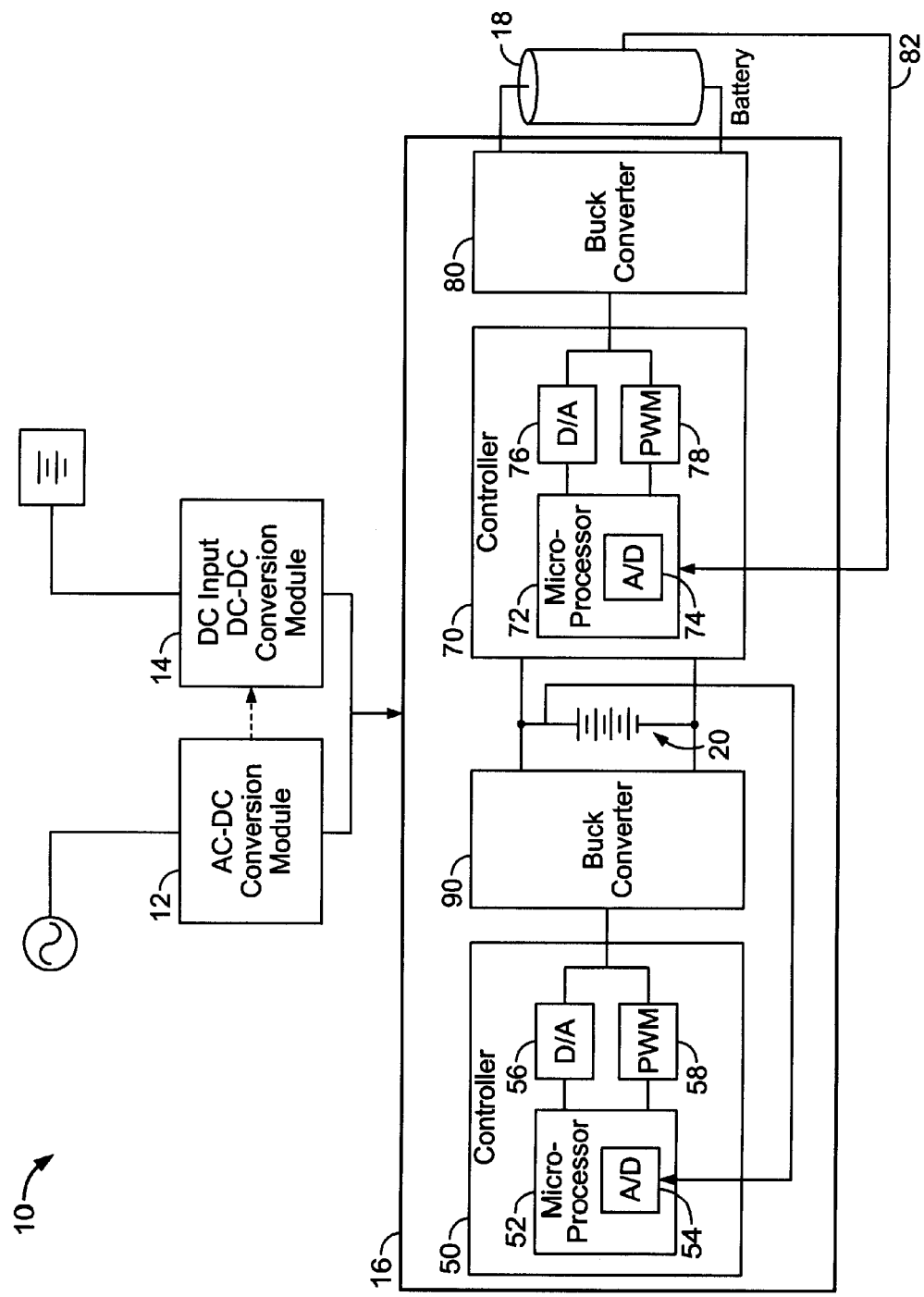
FIG. 3 is another block diagram of an exemplary embodiments of a portable charger device.

Referring to FIG. 3, the power storage and charging module 16 is configured to include at least one high power lithium ion rechargeable battery, and in some embodiments, two or more high-power lithium ion rechargeable batteries.

Figure 8:
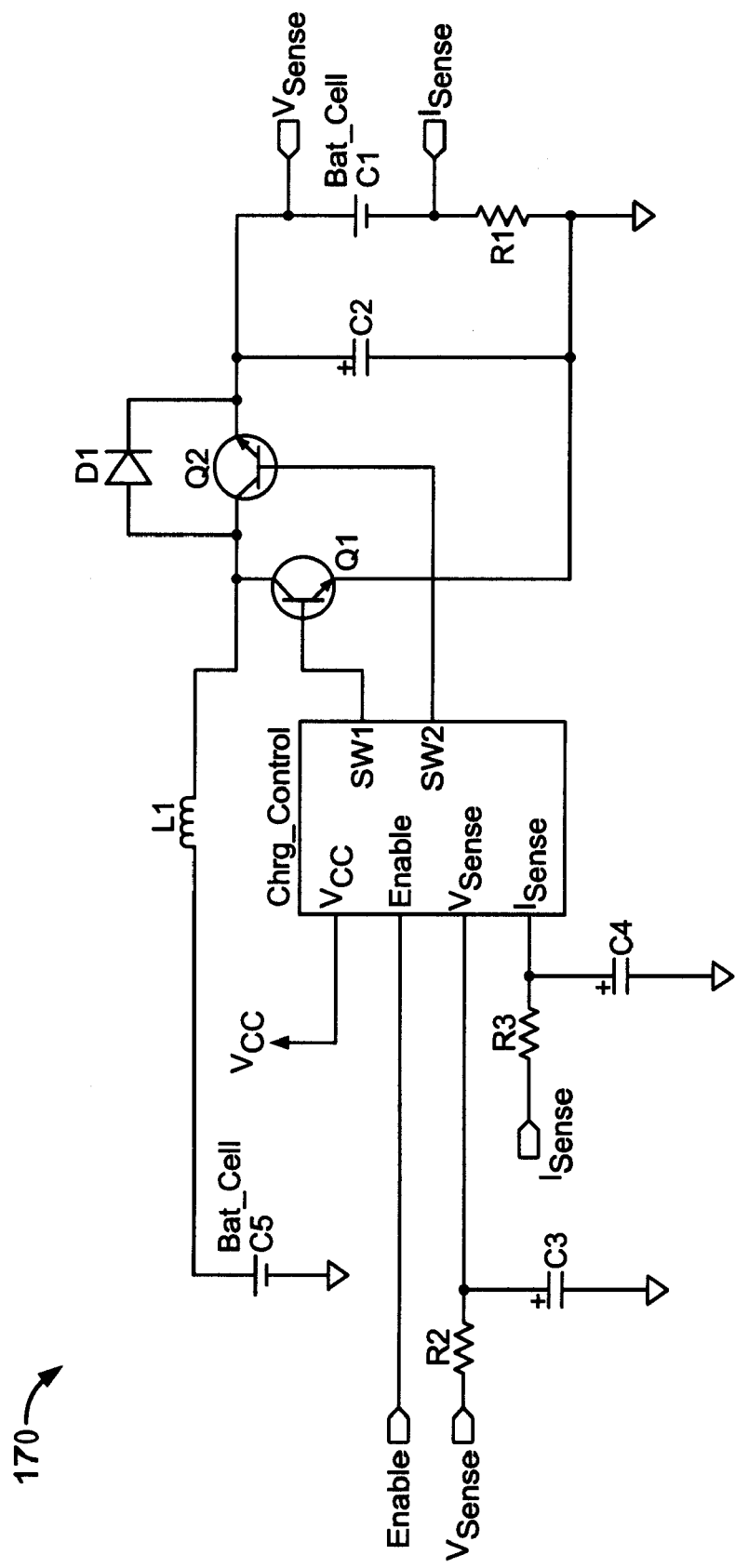
FIG. 8 is a circuit schematic of an exemplary embodiment of a voltage boost regulator circuit.

When only one internal battery is used to charge a depleted external battery, it is difficult to fully charge the external battery because the voltage of the internal charging battery will eventually be reduced to a value substantially equal to that of the external battery being charged. Thus, the external battery cannot, under these circumstances, attain its maximum voltage (corresponding to full, or near-full charge capacity.) Furthermore, to operate the circuitry of the power storage and charging module 16, a minimum voltage, e.g., 2.5V-3.0V, of the internal battery(s) is typically required. Accordingly, in circumstances where the power storage and charging module 16 includes a single internal rechargeable battery, a voltage boosting circuit is used to facilitate charging of the external circuit and operating the circuitry of the power storage and charging module 16. However, where a voltage boosting circuit is used, greater current is drawn from the internal charging battery, thus limiting the maximum charging current the device may deliver. The voltage boosting circuit control is configured to output the required charging voltage given the internal battery voltage varying from about 4V when fully charged to as low as 2V when fully discharged, thus allowing the full discharge capacity of the internal storage battery to be utilized for charging the external device or battery. The voltage boost circuit is configured to output the appropriate charging voltage required for the external device. For single battery user devices, this output charging voltage is typically 3.8V to 3.9V for Iron Phosphate type Li-Ion batteries, while the charging output voltage for Cobalt Oxide type Li-Ion batteries is 4.1V to 4.2V. FIG. 8 is a circuit schematic of an exemplary embodiment of a voltage boost regulator circuit 170. The boost circuit is configure to provide substantially a constant charging current while the external battery terminal voltage is below a charging voltage limit. When the external battery terminal voltage is equal to the charging voltage limit, the boost charge control circuit enters a constant voltage control mode and provides a substantially constant output voltage. The charging power output may be terminated based on elapsed charge time or based on a lower current threshold during the constant voltage phase of the charging process.

Two or more Li-Ion rechargeable batteries in series enable substantially complete use of the charge stored in the internal rechargeable batteries of the power storage and charging module 16, without the use of a boosting circuit, because of the higher voltage achieved when the batteries are connected in series. Additionally, the use of two or more storage batteries in series used in conjunction with a Buck regulating circuit provides charging current capability which is greater than the current delivery capability of the individual battery, by a factor roughly equal to the number of batteries in series. For example, two batteries in series which can provide 1 A of output current at an average voltage of 3. V will each supply the buck regulating circuit at 1 A and 6V. The buck regulator current output at 4V could be as high as 1.5 A, while the current output at 3V output could be 2.0 A (neglecting any inefficiencies of the converter.) In embodiments in which two internal rechargeable batteries in series are used to charge an external rechargeable battery, the resultant voltage at the output of the power storage and charging module 16 is generally between 4-8V. The output voltage is regulated (including performing voltage reduction) by, for example, a buck regulator such as the buck converter 80 shown in FIG. 3, to provide suitable current/voltage levels for charging the external rechargeable battery. Close to the completion of the charging process, the voltage of the internal charging battery would still be above the 4.0V needed for charging the external rechargeable battery. The voltage of the charging battery will also be above the voltage level required to operate the circuitry of the power storage and charging module 16 (e.g., 3.3V).

Typical Li-Ion batteries are charged to around 3.8V to 4.0V for Li-Iron-Phosphate cathode based batteries and 4.1V to 4.2V for Cobalt-Oxide cathode based batteries. The discharge cutoff voltage for batteries based on Li-Iron-Phosphate electrochemistry is typically around 2.0V, and around 2.5V for batteries based Cobalt-Oxide electrochemistry. The discharge cutoff voltage is the lowest voltage under load that the battery can be brought down to without sustaining potential adverse effects to the capacity or cycle life of the battery cells. Thus, the battery's discharge should be stopped when the battery's voltage reaches the discharge cutoff voltage.

The AC-DC power conversion module 12 and/or the DC input DC-DC power conversion module 14, charges the batteries 20. The power storage and charging module 16 is configured to initially cause a constant charging current to be applied to the internal rechargeable batteries 20 received in the internal battery chamber of the storage module 16. During the period in which a constant current is delivered to the batteries 20 (during this period the charger is said to be operating in constant current, or CC mode), the voltage of the batteries 20 increases. When the voltage of the internal batteries 20 reaches a pre-determined upper limit voltage of, for example, 3.8V (this upper limit voltage is sometimes referred to as the crossover voltage), the storage module 16 is configured to provide a substantially constant voltage at the upper limit level, applied to the batteries 20 for the remainder of the charging period. During the period that a constant voltage, substantially equal to the pre-determined crossover value, is applied to the batteries 20, the storage module 16 is said to be operating in constant voltage, or CV, mode.

During the period in which the internal charging batteries 20 are charged, the AC-DC power conversion module 12 may be electrically coupled to an AC power source, external to the charger 10, such as a source providing power at a rating of 85V-265V and 50 Hz-60 Hz, to convert the AC power to a low D.C. voltage suitable for charging the internal rechargeable batteries.

The configuration of the internal rechargeable batteries placed inside the storage module's charging chamber affects the voltage required to charge those batteries. For example, if a single charging battery is disposed in the charging chamber of the storage module 16, a voltage of approximately 4.0V may be required (the voltage required may vary according to the particular battery used for the internal charging battery.) If, on the other hand, two internal charging batteries are arranged in series in the charging chamber, a voltage of, for example, approximately 8V may be required to be applied to the internal rechargeable batteries. Conversely, if two batteries are placed in parallel, the charging current required would be twice that of a single battery.

Figure 5:
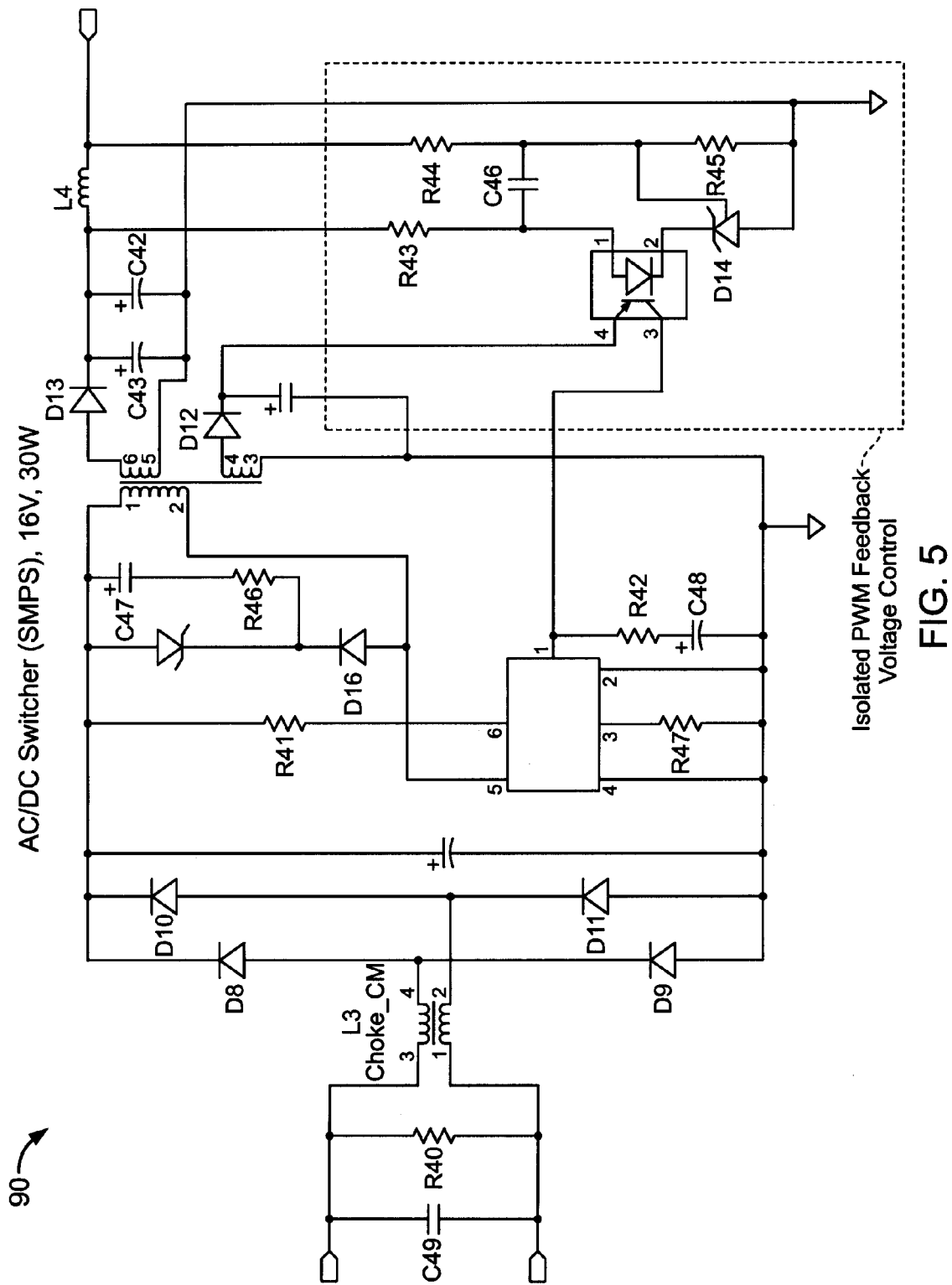
FIG. 5 is an exemplary embodiment of an AC-DC switcher.

Referring now to FIG. 5, the AC-DC power conversion module may be implemented as an isolated AC-DC switcher 90 that includes a transformer section, and is configured to accept input power at a first alternating voltage and transform it to a lower constant DC voltage. The AC-DC converter includes galvanic isolation between the AC input line and the DC output to prevent input AC current from reaching the DC output section of the AC-DC power conversion module 12 and to protect the user from accidental exposure to AC current.

As described herein, the AC-DC power conversion module may be electrically coupled to a DC input DC-DC power conversion module 14. The DC input DC-DC power conversion module 14 is configured to convert an external DC power source, such as a car's DC power supply, to a DC power level suitable for charging rechargeable batteries. The DC input DC-DC power conversion module may be implemented as a buck converter configured to reduce the effective DC voltage applied to the batteries 20 by causing switching devices (e.g., transistors), to be switched in a controlled manner to thus enable current to be delivered during the switching devices' on-period, and withdraw current during the switching devices' off-period. A detailed description of the operation of an exemplary buck converter circuit is provided below. Thus, for example, in some embodiments, a car's DC power supply supplies approximately 11.5V to 14.3V DC power, and the DC input DC-DC power conversion module 14 converts that power level to a suitable power level required to charge at least one internal rechargeable battery and/or operate the circuitry of the power storage module 16.

Turning back to FIG. 3, the power storage and charging module 15 also includes a controller 50 to determine the charging current to apply to the batteries 20. In some embodiments, the controller 50 is configured to terminate the charging current after a specified or pre-determined time period has elapsed. The controller 50 may also be configured to terminate the charging current once a pre-determined battery voltage or charge level has been reached. For example, the controller 50 regulates a DC-DC converter, such as a buck converter 60, so that a constant charge rate of, for example, 12 C (i.e., a charge rate of 1 C corresponds to the current that would be required to charge a battery in one hours, and thus 12 C is a charge rate that would to charge the particular battery in approximately $1/12$ of an hour, i.e., five minutes) is applied until a pre-determined upper-limit voltage is reached. Once the upper-limit voltage is reached, the controller 50 changes control modes and causes a constant voltage to the batteries 20 to be applied until the predetermined charge time has expired, e.g., 5 minutes.

In some embodiments, determination of the charging current to be applied to the batteries 20 may be based, at least in part, on user specified input provided through a user interface disposed, for example, on the power storage housing 40. Such a user interface may include, for example, switches, buttons and/or knobs through which a user may indicate, for example, the capacity of the of battery that is to be recharged. Additionally, in some embodiments, the interface may be configured to enable the user to specify other parameters germane to the charging process, such as, for example, the charging period (in circumstances where a charging period of e.g., 15 minutes to 1 hour, is desired.) To determine the specific charging current to use, a lookup table that indexes suitable charging currents corresponding to the user-specified parameters is accessed.

In some embodiments, determination of the charging current may be performed by identifying the capacity of the battery(s) placed in the charging chamber of the power storage module 16 using, for example, an identification mechanism that provides data representative of the battery capacity and/or battery type. A detailed description of an exemplary charger device that includes an identification mechanism based on the use of an ID resistor having a resistance representative of a battery's capacity is provided in the concurrently filed patent application entitled "Ultra Fast Battery Charger with Battery Sensing", the content of which is hereby incorporated by reference in its entirety.

Other types of battery identification mechanisms may be employed. For example, suitable battery identification mechanisms may include Radio Frequency Identification (RFID) mechanisms in which in response to an activation signal (e.g., a radio signal), an RFID device communicates to the charger 10 an electrical signal representative of the battery's capacity, type, etc. Other suitable identification mechanisms include mechanisms that implement serial communication techniques to identify the battery, e.g., the Smart Battery SMBus standards to cause identification data representative of the battery's capacity and/or type to be communicated to the charger 10 via a serial data communication interface. Alternatively, a proprietary interface could be used to enable communication of the information germane to the charging process to the controller to facilitate the determination of the charging current to apply to the batteries.

In some embodiments, determination of the charging current may be performed by measuring at least one of the battery's electric characteristics indicative of the capacity and/or type of battery (e.g., the battery's DC charging resistance.) A detailed description of an exemplary charger device that adaptively determines the charging current based on measured characteristics of the battery is provided in the concurrently filed patent application entitled "Adaptive Charger Device and Method", the content of which is hereby incorporated by reference in its entirety.

The controller 50 includes a processor device 52 configured to control the charging operations performed on the batteries 20. The processor device 52 may be any type of computing and/or processing device, such as a PIC18F1320 microcontroller from Microchip Technology Inc. The processor device 52 used in the implementation of the controller 50 includes volatile and/or non-volatile memory elements configured to store software containing computer instructions to enable general operations of the processor-based device, as well as implementation programs to perform charging operations on the internal rechargeable batteries 20 disposed in the charging chamber of the power storage and charging module 16, including such charging operations that achieve at least 90% charge capacity of the internal batteries 20 in less than fifteen (15) minutes. The processor device 52 includes an analog-to-digital (A/D) converter 54 with multiple analog and digital input and output lines. The controller 50 also includes a digital-to-analog (D/A) converter device 56, and/or a pulse-width modulator (PWM) 58 that receives digital signals generated by the processor device 52 and generates in response electrical signals that regulate the duty cycle of the switching circuitry, such as the buck converter 60 of the power storage module.

Figure 4:
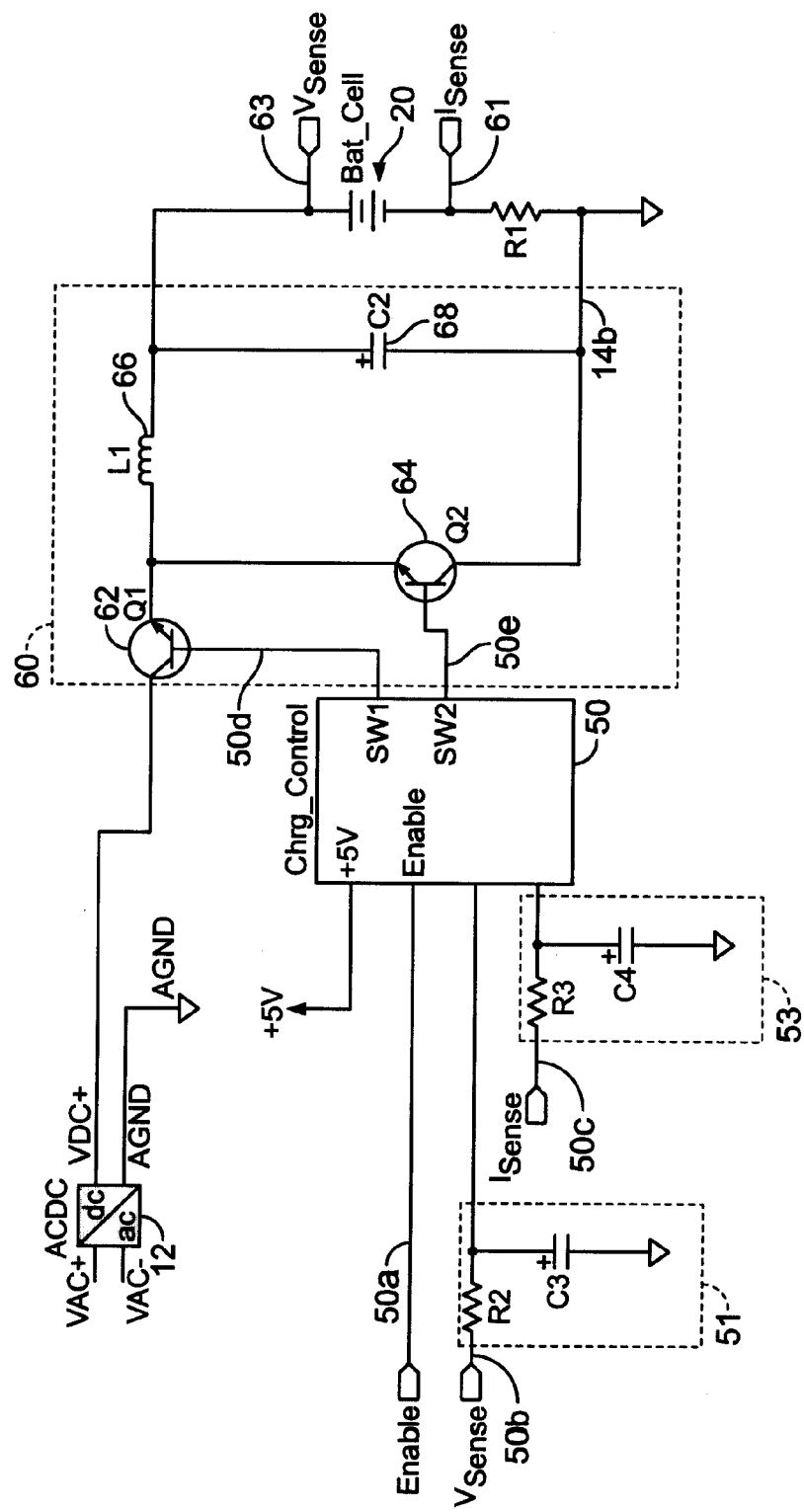
FIG. 4 is a circuit schematic of an exemplary charging circuit used by the charger device of FIGS. 1 and 3.

Referring now to FIG. 4, the buck converter 60 includes two, e.g., Bi-Polar Junction Transistors (BJT's) 62 and 64 and an inductor 66 that stores energy when the power conversion module 12 and/or 14 are in electrical communication with the buck converter 60, and which discharges that energy as current during periods that the power conversion modules 12 and/or 14 are electrically isolated from the buck converter 60. The buck converter 60 shown in FIG. 4 also includes a capacitor 68 that is also used as an energy storage element. The inductor 66 and the capacitor 68 also act as output filters to reduce the switching current and voltage ripples at the output of the buck converter 60.

Power transmitted to the internal batteries 20 from the AC-DC power conversion module 12 and/or the DC input DC-DC power conversion module 14 is regulated by controlling the voltage level applied to the bases of the transistors 62 and 64. To cause power from the power conversion modules to be applied to the batteries 20, an actuating electric signal from a terminal 50d (marked SW1) of the controller 50 is applied to the base of the transistor 62, resulting in the flow of current from the power conversion modules 12 and/or 14 to the transistor 62 and to the batteries 20.

When the actuating signal applied to the base of the transistor 62 is removed, current flow from the power conversion modules 12 and/or 14 stops and the inductor 66 and/or the capacitor 68 supply current from the energy stored in them. During the off-period of the transistor 62, a second actuating signal is applied by the terminal 50e (marked SW2) of the controller 50 to the base of a transistor 64 to enable current flow (using the energy that was stored in the inductor 66 and/or the capacitor 68 during the on-period of the transistor 62) through the batteries 20. In some embodiments, a rectifying diode is utilized in place of transistor 64, the diode providing similar functionality as the transistor 64.

The transistor's on-period, or duty cycle, is initially ramped up from 0% duty cycle, while the controller or feedback loop measures the output current and voltage. Once the determined charging current to be applied to the batteries 20 is reached, the feedback control loop manages the transistor duty cycle using a closed loop linear feedback scheme, e.g., using a proportional-integral-differential, or PID, mechanism. A similar control mechanism may be used to control the transistor's duty cycle once the charger voltage output, or battery terminal voltage, reaches the crossover voltage.

Thus, the current provided by the power conversion modules during the on-period of the transistor 62, and the current provided by the inductor 66 and/or the capacitor 68 during the off-periods of the transistor 62 should result in an effective current substantially equal to the required charging current.

In some embodiments, controller 50 periodically receives (e.g., every 0.1 second) a measurement of the current flowing through the battery 12 as measured, for example, by a current sensor 61 that communicates the measured value via a terminal 50c (marked ISENSE) of the controller 50. Based on this received measured current, the controller 50 adjusts the duty cycle to cause an adjustment to the current flowing through the batteries 20 so that that current converges to a value substantially equal to the charging current level. The buck convener 60 is thus configured to operate with an adjustable duty cycle that results in adjustable current levels being supplied to the batteries 20.

The controller 50 is further configured to maintain the voltage at the terminals of the battery 12 at about a substantially constant pre-determined upper voltage limit once that upper limit is reached. While the batteries 20 are being charged with a current substantially equal to the charging current, the voltage at terminals of the battery increases. To ensure that the voltage at the batteries' terminals do not exceed the predetermined upper voltage limit (so that the batteries do not overheat, or that the batteries' operation or expected life are not otherwise adversely affected), the voltage at the terminals of the batteries 20 is periodically measured (e.g., every 0.1 seconds) using a voltage sensor 63 to determine when the pre-determined upper voltage limit has been reached. The measured voltage is communicated to the controller 50 via a terminal 50b (marked VSENSE.) When the voltage at the terminals of the batteries 20 has reached the predetermined upper voltage limit, the current/voltage regulating circuit is controlled to cause a substantially constant voltage at the terminals of the batteries 20.

In some embodiments, the controller 50 is configured to monitor the voltage increase rate by periodically measuring the voltage at the terminals of the batteries 20 and adjust the charging current applied to the batteries 20 such that the predetermined upper voltage limit is reached within some specified voltage rise period of time. Based on the measured voltage increase rate, the charging current level is adjusted to increase or decrease the charging current such that the pre-determined upper voltage limit is reached within the specified voltage rise period. Adjustment of the charging current level may be performed, for example, in accordance with a predictor-corrector technique that uses a Kalman filter. Other approaches for determining adjustments to the current to achieve the pre-determined upper voltage limit may be used.

In addition to the voltage sensor and/or the current sensor, the charger 10 may include other sensors configured to measure other attributes of either the batteries 20 and/or the charger 10. For example, the charger 10 may include temperature sensors (e.g., thermistor-based) coupled to one or more of the batteries 20, the circuit board on which the controller 50 is arranged, the power conversion modules 12 and/or 14, etc. Such temperature sensors are configured to enable the charger 10 to take remedial or preemptive actions in the event that one or more of the charger's modules and/or components is overheating (e.g., the temperature of the board exceeds 60° C.) Remedial and/or preemptive actions to counter unsafe operating conditions include terminating the charging operation, or reducing the charging current to cause the temperature of the batteries 20 and/or the charger 10 to decrease. In circumstances where the batteries 20 are lithium-iron-phosphate batteries having a low charging resistance that does not result in significant heat generation during the charging operation, or in circumstances where the charging operation is performed in a short period of time, e.g., 5-15 minutes, the charger 10 may be implemented without thermal control and/or thermal monitoring mechanisms. Thus, in such embodiments, the operations of determining the temperatures of the battery and/or the charger, and responding thereto, are not performed.

The received measured signals are processed using analog logic processing elements (not shown) such as dedicated charge controller devices that may include, for example, threshold comparators, to determine the level of the voltage and current level measured by the voltage and/or current sensors. The charger 10 may also include a signal conditioning blocks, such as filters 51 and 53, for performing signal filtering and processing on analog and/or digital input signals to prevent incorrect measurements (e.g., incorrect measurements of voltages, temperatures, etc.) that may be caused by extraneous factors such as circuit level noise.

With reference again to FIG. 3, the power storage and charging module 16 further includes a second charging circuitry to convert the voltage of the arrangement of batteries 20 to a voltage suitable for charging the external battery 18 and provide the converted voltage to the external battery 18. In some embodiments, the second charging converter circuitry may have a configuration and may perform operations similar to the configuration and operations of the circuitry used to regulate the current/voltage applied to the batteries 20 from the power conversion modules 12 and/or 14.

Thus, the second charging circuitry includes a second controller 70 configured to determine the charging current to be applied to the external rechargeable battery 18, and apply to the external battery 18 a current substantially equal to the determined charging current. The second controller 70 may also be configured to terminate the charging current after a specified or pre-determined time period has elapsed. The controller 70 may further be configured to terminate the charging current once a pre-determined battery voltage or charge level has been reached.

The controller 70 is configured to control another DC-DC converter circuitry, such as, for example, a buck converter 80. Because the current that is to be applied to the external battery 18 is drawn from limited stored energy, the controller 70 may be configured to limit the external charging current to levels not exceeding 3 A. For example, in circumstances in which the external charging current is approximately 2.5 A, an external rechargeable battery having a capacity of 500 mAh would be charged in approximately twelve (12) minutes (0.5 Ah/2.5 A=0.2 hours=12 minutes), corresponding to a charge rate of 5 C.

Like the controller 50, the controller 70 may be configured to apply the determined charging current until a second pre-determined upper-limit voltage for the external battery 18 is reached, or a certain period of time (e.g., 10 minutes) has expired. Once the maximum charge voltage is reached, or the time period expired, the controller 70 changes control modes and applies a constant voltage to the external battery 18 until a further pre-determined time period has expired, e.g., 5 minutes after the transition to the constant voltage mode for charging the external battery.

As with the charging operation for the internal charging batteries 20, in some embodiments, determination of the charging current to be applied to the external battery 18 may be based, at least in part, on user specified input provided through the user interface disposed on the storage module housing 40. Such a user interface may include, for example, switches, buttons and/or knobs through which a user may indicate, for example, the capacity of the of battery that is to be recharged. Additionally, in some embodiments, the interface may be configured to enable the user to specify other parameters germane to the charging process, such as, for example, the charging period (in circumstances where a longer charging period, e.g., 15 minutes to 1 hour, is desired.) To determine the specific charging current to use, a lookup table that indexes suitable charging currents corresponding to the user-specified parameters is accessed. Additionally, in some embodiments, determination of the charging current to be applied to the external battery 18 may be performed by identifying the capacity of the battery 18 placed in the charging compartment using, for example, an identification mechanism that provides data representative of the battery capacity and/or battery type, or by measuring, for example, the battery's DC charging resistance to thus identify the external battery 18 to be charged.

The controller 70 includes a processor device 72 configured to control the charging operations performed on the battery 18, and may be, for example, a PIC18F1320 microcontroller from Microchip Technology Inc. In some embodiments, the processor 52, used to control the charging operation of the internal charging batteries 20, may to also control the charging operation to be performed on the external battery 18. In circumstances where another separate processor is used to control the charging operation of the external battery 18, the processor device 72 used in the implementation of the controller 70 includes volatile and/or non-volatile memory elements configured to store software containing computer instructions to enable general operations of the processor-based device, as well as implementation programs to perform charging operations on the external battery 18, including such charging operations that achieve at least 90% charge capacity in less than fifteen (15) minutes. The processor device 72 includes an analog-to-digital (A/D) convener 74 with multiple analog and digital input and output lines. The controller 70 also includes a digital-to-analog (D/A) converter device 76, and/or a pulse-width modulator (PWM) 78 that receives digital signals generated by the processor device 72 and generates in response electrical signals that regulate the duty cycle of switching circuitry, such as the buck converter 80 of the second charging circuit.

The controller 70 actuates the buck converter 80 to regulate the current/voltage delivered by the internal charging batteries 20. As explained in relation to the buck converter 60 used to regulate the current/voltage provided by the power conversion modules 12 and/or 14, the buck converter 80 may include transistors (not shown) or other types of switching devices, that are electrically actuated to enable current/voltage supplied by the internal batteries 20 to be applied to the external battery 18. The buck converter 80 may also include an energy storage elements (e.g., capacitor and/or an inductor) that stores energy when current is delivered to the buck converter during the on-period of the converter's switching devices. Thus, when the switching devices cause current delivered from the batteries 20 to be cut-off from external battery 18, the energy in the energy storage element(s) is discharged into the external battery 18. The current resulting from current applied during the switching devices' on-period and the current discharged from the energy storage element(s) during the switching devices' off-period is substantially equal to the required charging current to be applied to the external battery 18.

To regulate the current/voltage drawn from the batteries 20, the secondary charging circuit also includes a feedback adjustment mechanism, implemented, for example, using the controller 80. The feedback adjustment mechanism is used to adjust the duty cycle for actuating the switching devices of the DC-DC converter (e.g., the buck converter 80) so that the resulting current applied to the external battery 18 will substantially equal the charging current determined by the controller 80. For example, in some embodiments, the controller 70 periodically receives (e.g., every 0.1 second) a measurement of the current flowing through the batteries 18 as measured, for example, by a current sensor (not shown) that communicates the measured value to controller 80 (for example, using the wire 82 shown in FIG. 3). Based on this received measured current, the controller 70 adjusts the duty cycle to cause an adjustment to the current flowing through the external battery 18 so that that current converges to a value substantially equal to the charging current level. The buck converter 80 is thus configured to operate with an adjustable duty cycle that results in adjustable current levels being supplied to the external battery 18.

The second charging circuit may also employ a voltage sensor (not shown), as well as other sensors configured to measure other attributes of either the external battery 18 and/or the power storage and charging module 16. For example, in embodiments in which thermal control of the power storage and charging module 16 is required (e.g., when the charging period to charge the external battery 18 exceeds 15 minutes), the power storage and charging module 16 may include temperature sensors (e.g., thermistors) coupled to the external battery 18 and/or to a circuit board on which, the power storage and charging module 16 is disposed.

The output of the device may be protected from short circuit and over-current conditions by the use of either an active circuit with a MOSFET or Transistor type solid state power switch, which would open the solid state switch when an over-current condition is detected. Alternatively or in combination, a PTC protective device could also be utilized to limit the maximum current drawn.

Figure 6A:
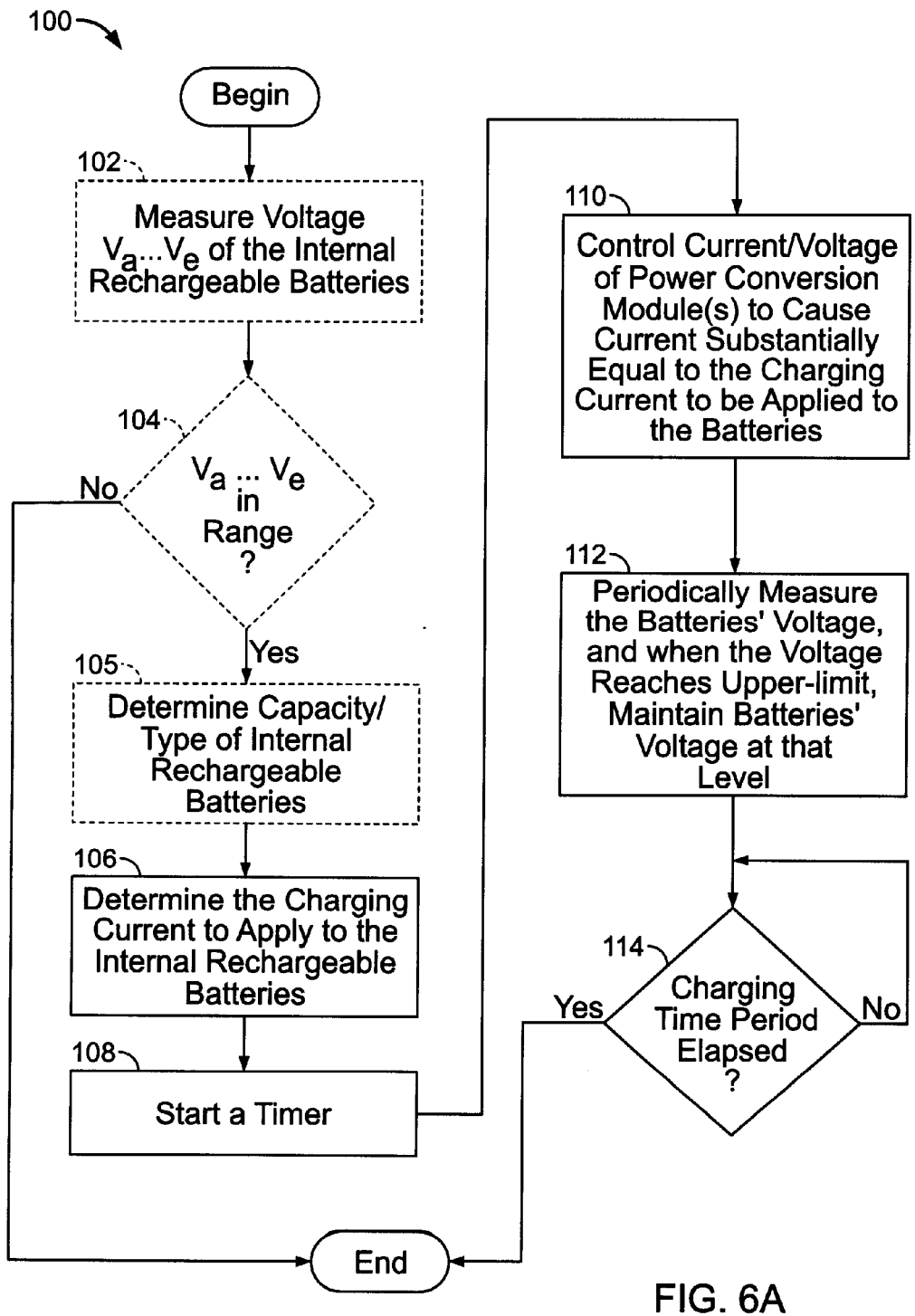
FIG. 6A is a flow diagram of an exemplary embodiment of a charging procedure to charge rechargeable charging batteries.

FIG. 6A depicts an exemplary charging procedure 100 to recharge the internal rechargeable batteries 20 included in the housing 40 of the portable charger device 10. The batteries 20 are initially placed inside the inner battery chamber of the housing 40. To charge the batteries 20, the housing 40 in which the batteries 20*a-e* and the charging circuitry are disposed, is mechanically attached to the housing 30 containing the AC-DC power conversion module 12 and/or the DC input DC-DC power conversion module 14. When the housings 40 and 30 become mechanically attached, the power storage and charging module 16 is electrically coupled to the power conversion modules 12 and/or 14.

When an external electrical source is connected the power conversion modules 12 and/or 14, the charging operation of the internal batteries 20*a-e* can commence. In some embodiments, a user may initiate the charging cycle by pressing a 'START' button disposed on the housing 30 or the housing 40.

Optionally, prior to commencing the charging procedure, the charger 10 determines whether certain fault conditions exist. For example, the charger 10 measures 102 the respective voltages $V_a \ldots V_e$ corresponding to the batteries 20 (i.e., measure the voltages of the various individual batteries in the internal chamber of the housing 40.) The charger 10 determines 104, whether the measured voltages are within a pre-determined range (e.g., between 2-3.8V.) In circumstances in which it is determined that the measured voltages, $V_a \ldots V_e$, of any of the batteries 20 are not within the predetermined acceptable ranges, thus rendering a charging operation under current conditions to be unsafe, the charger does not proceed with the charging operation, and the charging process may terminate. Under these circumstances, an indication of a problem may be provided to the user via a user interface on the housing 30 and/or housing 40.

The charger 10 determines 106 a charging current and/or a charging period to be used to charge the batteries 20 based on information germane to the charging process, including the type of batteries, the charging period, the batteries' capacity, etc. For example, the charger 10 may be configured to determine a charging current to charge the batteries 20 to at least a 90% charge capacity in less than 15 minutes. In some embodiments, charging current suitable for longer charging periods (e.g., 1-4 hours), different battery capacities, and different charge levels, may be determined.

The information used to determine the charging current may be provided through a user interlace disposed, for example, on the power conversion housing 30 and/or the storage housing 40. Additionally and/or alternatively, such information may be provided through an identification mechanism through which the batteries, for example, can communicate to the charger information representative of their characteristics (e.g., capacity, type.) In some embodiments, determination of the charging current to apply may be based on information obtained by measuring electrical characteristics of the batteries (e.g., the DC charging resistance), and determining, based on such measurements, the type and/or capacity of the batteries 20. If the charger 10 is configured to receive a particular type of battery having a particular type of capacity, the charger 10 uses a pre-determined charging current suitable for that particular battery and capacity. Determination of the charging current may be performed by accessing a lookup table that associates charging currents with different battery capacities, battery types, charging periods, etc. Thus, optionally, the charger 10 may determine 105 the capacity and/or type of the batteries 20 inserted into the charging chamber of the housing 40.

Having determined the charging current to be applied to batteries 20, a timer, configured to measure the pre-specified time period of the charging operation, is started 108. The timer may be, for example, a dedicated timer module of the processor 52, or it may be a register that is incremented at regular time intervals measured by an internal or external clock of the processor 52.

A current/voltage regulating circuit, such as, for example, the buck converter 60 shown in FIG. 4, is controlled 110 to cause a constant current substantially equal to the determined current to be applied to the internal rechargeable batteries 20. As explained, the charging current determined is used to generate a duty cycle signal, applied, for example, to the transistor 62 of the buck converter 60, to cause current substantially equal to the charging current to be applied to the batteries 20. During the off-time of a particular duty cycle, the power conversion modules 12 and/or 14 is cutoff from the batteries 20, and the energy stored in the inductor 66 and/or capacitor 68 is discharged to the batteries as current. The combined current applied from the power conversion module 12 and/or 14, and the current discharged from the inductor 66 and/or the capacitor 68 result in an effective current substantially equal to the determined charging current.

In some embodiments, the charger 10 implements a CC/CV charging process. Thus, in such embodiments, the voltage at the terminals of the batteries 20 is periodically measured 112 (e.g., every 0.1 seconds) to determine when the pre-determined upper voltage limit (i.e., the crossover voltage) has been reached. When the voltage of the batteries (either the combined voltage between of the arrangement of the batteries 20, or the individual voltages of the batteries 20) has reached the pre-determined upper voltage limit, the current/voltage regulating circuit is controlled (e.g., through electrical actuation of the transistors 62 and 64) to have a constant voltage level, substantially equal to the crossover voltage level, maintained at the terminals of the batteries 20.

After a period of time substantially equal to the charging time period has elapsed, as determined 114, or after a certain charge or voltage level has been reached (as may be determined through periodical measurements of the batteries 20) the charging current applied to the batteries 20 is terminated (for example, by ceasing electrical actuation of the transistor 62 to cause power delivered from the power conversion modules 12 and/or 14 to be terminated).

At the conclusion of the charging operation of the internal batteries 20 the portable charger device can be disconnected from the external power source, and the portable charger device may be used to charge external rechargeable batteries, such as the external battery 18, using charging current drawn from internal batteries 20. The user may decide not to carry the power conversion housing 30 with him/her, particularly in situations where the user does not want to be overly burdened by heavy items or when the user does not expect that an external power source would become available, and thus may separate the storage housing 40 from the power conversion housing 30 by pulling, or unlatching the housing 40 from the power conversion housing 30. For example, where latching tabs, such as latching tabs 44a-e, are used to mechanically attach the two housings to each other, the housing 40 is pulled out by prying the latching tabs 44a-e from the corresponding slots defined in the depression 32 of the housing 30.

Figure 6B:
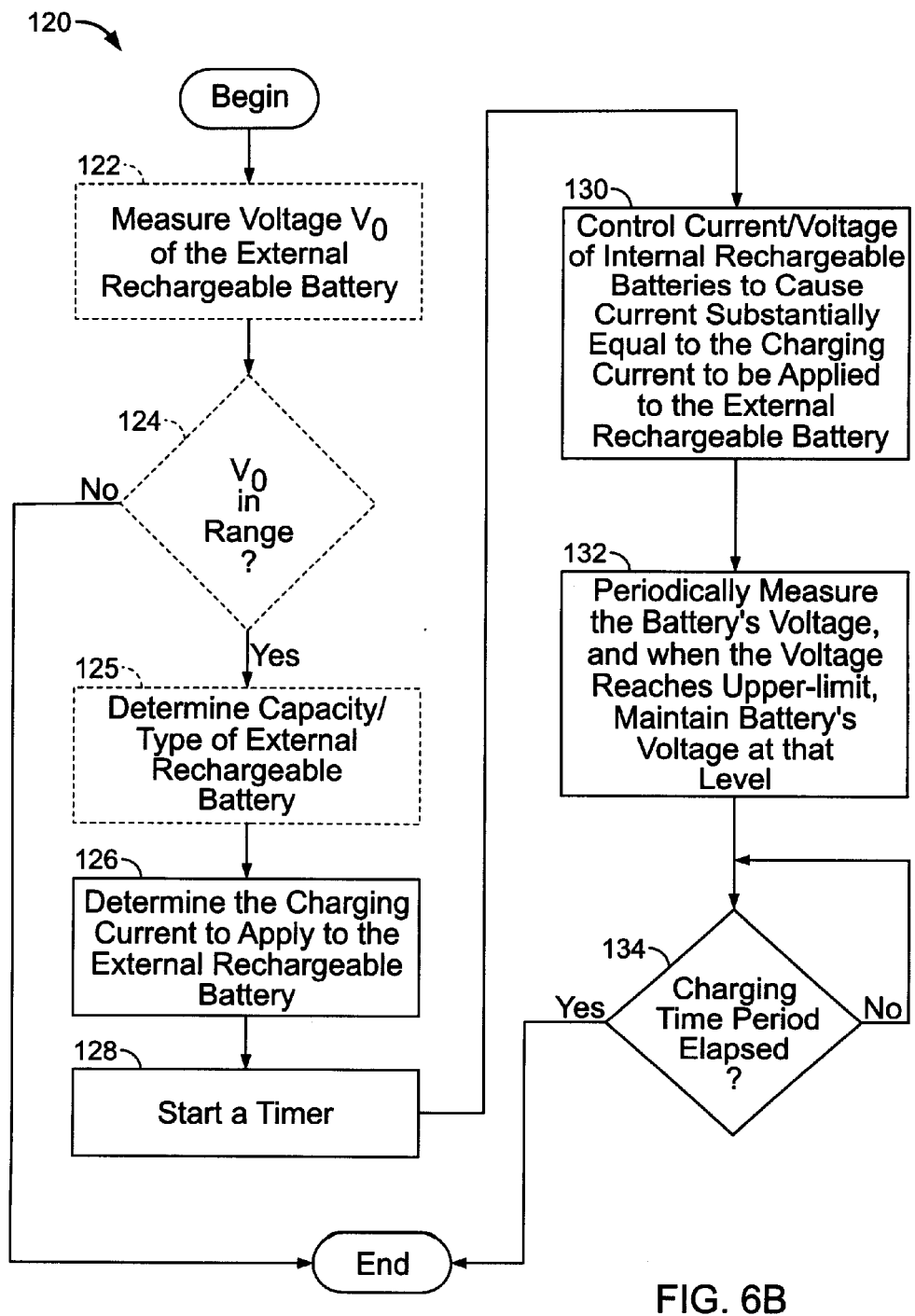
FIG. 6B is a flow diagram of an exemplary embodiment of a charging procedure to charge external rechargeable batteries.

FIG. 6B is a flow chart showing an exemplary embodiment of a charging procedure 120 to recharge the external battery 18. The charging process for the external battery 18 is similar to the charging process for the internal rechargeable batteries 20. Thus, optionally, prior to commencing the charging process for the external battery 18, a determination made be made whether certain fault conditions exist. For example, the initial voltage $V_0$ of the battery 18 is measured 122. The charger 10 determines 124, whether the measured voltage is within a predetermined range (e.g., between 2-3.8V), and if not, the charging procedure of the battery 18 is terminated, and a proper indication that the charging procedure of the external battery 18 has been terminated, and/or the possible problems that caused the termination, may be indicated on a user interface disposed on the housing 40.

The charger 10, or more specifically, the power storage and charging module 16, determines 126 a charging current and/or a charging period to be used to charge the battery 18 based on information germane to the charging process, including the type of battery, the charging period, the battery's capacity, etc. For example, the charger 10 may be configured to determine a charging current to charge the battery 18 at least a 90% charge capacity in less than 15 minutes, in circumstances where the current that can be drawn from the internal batteries 20 is not sufficient to charge the external battery 18 to at least 90% capacity in a time period of less than 15 minutes, the power storage and charging module 16 determines optimal charging times and targeted charge levels given the constraints imposed by the characteristics of the internal batteries 20. Thus, in some embodiments, the power storage and charging module 16 may compute a charging profile that would result in a lower target charge level (e.g., 80%), or in a longer charging period (e.g., 20 minutes, to maximize the use of the internal battery's stored energy.)

The information used to determine the charging current may be provided through a user interface disposed, for example, on the storage housing 40. Additionally and/or alternatively, such information may be provided through an identification mechanism through which the battery 18 can communicate to the charger information representative of its characteristics (e.g., capacity, type.) In some embodiments, determination of the charging current to apply may be based on information obtained by measuring electrical characteristics of the batteries (e.g., DC charging resistance), and determining, based on such measurements, the type and/or capacity of the external battery 18. If the power storage and charging module is configured to be electrically coupled to a particular type of external rechargeable battery having a particular type of capacity, the charger 10 uses a pre-determined charging current suitable for that particular battery and capacity. Determination of the charging current may be performed by accessing a lookup table that associates charging currents with different battery capacities, battery type, charging periods, etc. Thus, optionally, the charger 10 may determine 125 the capacity and/or type of the external battery 18 inserted into the charging compartment.

Having determined the charging current to be applied to battery 18, a timer, configured to measure the time period of the charging operation, is started 128. The timer may be, for example, a dedicated timer module of the processor 72 (or the processor 52), or it may be a register that is incremented at regular time intervals measured by an internal or external clock of the processor 72 (or the processor 52.)

A current/voltage regulating circuit, such as, for example, the buck converter 80 shown in FIG. 3, is controlled 130 to cause a constant current that is substantially equal to the determined current to be applied to the external rechargeable battery 18. As explained, the charging current determined is used to actuate switching devices (e.g., transistors) of the buck converter 80, thus causing current substantially equal to the charging current to be provided by the internal rechargeable batteries 20 and applied to the battery 18.

In some embodiments, the power storage and charging module 16 implements a CC/CV charging process. Thus, in such embodiments, the voltage at the terminals of the batteries 18 is periodically measured 132 (e.g., every 0.1 seconds) to determine when the pre-determined upper voltage limit (i.e., the crossover voltage) has been reached. When the voltage of the battery 18 has reached the pre-determined upper voltage limit e.g., 4.2V, the current/voltage regulating circuit is controlled to have a constant voltage level, substantially equal to the crossover voltage level, maintained at the terminals of the external battery 18.

After a period of time substantially equal to the charging time period has elapsed, as determined 134, or after a certain charge or voltage level has been reached (as may be determined through periodical measurements of the external rechargeable battery 18) the charging current applied to the battery 18 is terminated.

In some embodiments, the charger device may charge external batteries while simultaneously being charged itself. In this way a user could, e.g., from his/her vehicle charge his/her portable devices as well as charge the internal batteries 20 of the portable storage device. In so doing the user maximizes the amount of stored energy he/she can take into the field for remote use. In some embodiments, the external battery 18 can be recharged using current provided by the external power source (AC or DC) through the power conversion modules 12 and/or 14. Specifically, in such embodiments, the charger 10 determines that an external power source is coupled to the charger, thus causing current to both be applied to the internal rechargeable batteries 20 (if they are depleted and have to be recharged) and to the external battery 18. Under those circumstances, the internal batteries 20 do not have to be used to charge the external battery 18.

Figure 7:
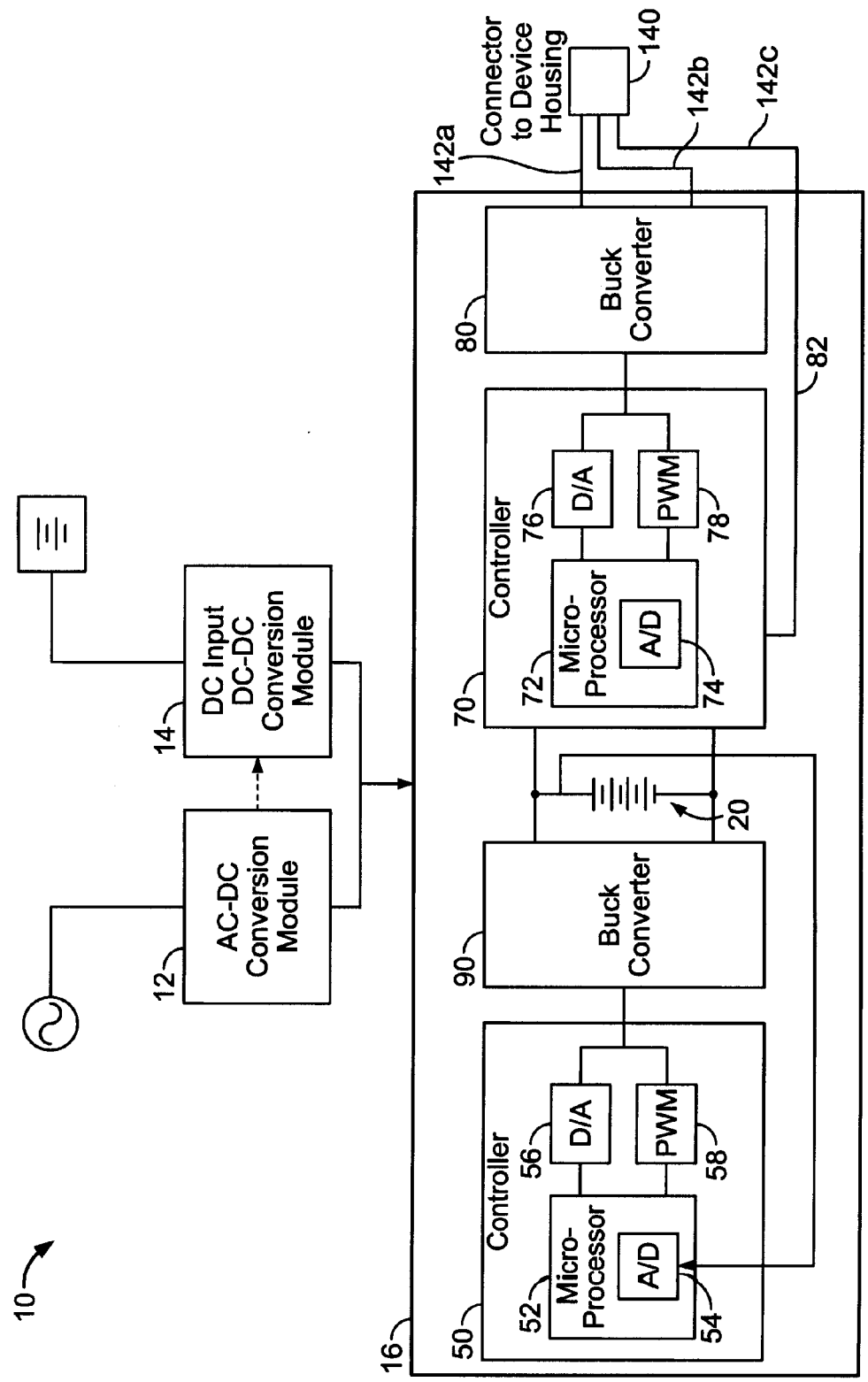
FIG. 7 is a block diagram of another exemplary embodiments of a portable charger device.

Referring to FIG. 7, in some embodiments, an external battery (not shown) may be coupled to charger device 10 through a connector device 140 connected to an interface of the charger device 10 (e.g., the harness interface 46 shown in FIGS. 2B and 2C) through electrical conductors 142a-c. The connector device 140 may include a charging compartment (not shown) to receive the external battery(s) that is to be recharged using the device 10.

EXAMPLES AND OTHER EMBODIMENTS

Additional alternatives embodiments include charger devices whose internal batteries have rechargeable chemistries that include, in addition to chemistries adapted for fast-charge operations, Ni-MH, Ni—Cd, Lead_Acid, as well as various Lithium-Ion chemistries.

A number of embodiments of the invention have been described. Nevertheless, it will be understood that various modifications may be made without departing from the spirit and scope of the invention. Accordingly, other embodiments are within the scope of the following claims.

What is claimed is:

1. A portable charger device to charge one or more external rechargeable batteries, the device comprising:
   a chamber configured to hold at least one rechargeable charging battery; and
   at least one controller configured to:
      determine a first charging current level to apply to the at least one rechargeable charging battery such that the at least one rechargeable charging battery achieves a first pre-determined charge that is reached within a first period of time of 15 minutes or less;
      cause a first charging current substantially equal to the determined first charging current level to be applied to the at least one rechargeable charging battery;
      determine a second charging current to apply to the one or more external rechargeable batteries; and
      cause a second charging current substantially equal to the determined second charging current level to be applied to the one or more external rechargeable batteries, the second charging current being drawn from the at least one rechargeable charging battery.

2. The device of claim 1, wherein the at least one controller is further configured to periodically adjust the first charging current after a first pre-determined voltage level of the at least one rechargeable charging battery is reached to maintain the voltage at the terminals of the at least one rechargeable charging battery at the first pre-determined voltage level.

3. The device of claim 1, wherein the at least one controller is further configured to periodically adjust the second charging current after a second pre-determined voltage level of the at the one or more external rechargeable batteries is reached to maintain the voltage at the terminals of the one or more external rechargeable batteries at the second pre-determined voltage level.

4. The device of claim 1, wherein the at least one controller is configured to determine the second charging current to apply to the one or more external rechargeable batteries such that the one or more external rechargeable batteries achieves a second pre-determined charge level that is reached within a second period of time of 15 minutes or less.

5. The device of claim 4, wherein the second pre-determined charge level of the one or more external rechargeable batteries is at least 90% of the charge capacity of the one or more external rechargeable batteries, and wherein the second period of time is approximately between 5-15 minutes.

6. The device of claim 1, wherein the chamber and controller are housed in a first housing, the first housing having plural latching tabs, the device further comprising a power conversion module housed in a second, different housing having plural latching tabs that mate with the plural latching tabs of the first hosing to couple to the first housing, the power conversion module configured to convert an external power supply voltage level to a charging voltage level to be applied to the at least one rechargeable charging battery.

7. The device of claim 6, wherein the power conversion module includes at least one of: an AC-DC power conversion module and a DC input DC-DC power conversion module, with the latching tabs constructed from electrically conductive materials such that when the first housing is mechanically attached to second housing, the device is in electrical communication with the power conversion module to provide the charging current to charge internal charging battery.

8. The device of claim 6 wherein a first one of the first and second housings have a base portion carrying the tabs, and the second one of the first and second housings having a cavity portion carrying the corresponding tabs and configured to receive the base portion to mechanically attach the first and second housings.

9. The device of claim 1, further comprising the at least one rechargeable charging battery, with the at least one rechargeable battery being at least two rechargeable charging batteries connected in a series configuration.

10. The device of claim 1, further comprising the at least one rechargeable charging battery including one or more Li-Ion batteries.

11. The device of claim 1, further comprising the at least one rechargeable battery including one or more Lithium-Iron-Phosphate batteries.

12. The device of claim 1, wherein the first pre-determined charge level of the at least one rechargeable charging battery is at least 90% of the charge capacity of the at least one rechargeable charging battery, and wherein the first period of time is approximately between 5-15 minutes.

13. The device of claim 1, further comprising a charging compartment configured to receive the one or more external rechargeable batteries.

14. The charging device of claim 1, wherein the at least one controller includes a processor-based micro-controller.

15. A method comprising:
   determining a first charging current level to apply to at least one rechargeable charging battery such that the at least one rechargeable charging battery achieves a first pre-determined charge that is reached within a first period of time of 15 minutes or less;
   applying to the at least one rechargeable charging battery a first charging current substantially equal to the determined first charging current level;
   determining a second charging current to apply to one or more external rechargeable batteries; and
   applying to the one or more external rechargeable batteries a second charging current substantially equal to the determined second charging current level, the second charging current being drawn from the at least one rechargeable charging battery.

16. The method of claim 15, further comprising:
   periodically adjusting the first charging current after a first pre-determined voltage level of the at least one rechargeable charging battery is reached to maintain the voltage at the terminals of the at least one rechargeable charging battery at the first pre-determined voltage level.

17. The method of claim 15, further comprising:
   periodically adjusting the second charging current after a second pre-determined voltage level of the at the one or more external rechargeable batteries is reached to maintain the voltage at the terminals of the one or more external rechargeable batteries at the second pre-determined voltage level.

18. The method of claim 15, wherein determining the second charging current comprises determining the second charging current such that the one or more external rechargeable batteries achieves a second pre-determined charge level that is reached within a second period of time of 15 minutes or less.

19. The device of claim 18, wherein the second pre-determined charge level of the at least one or more external rechargeable batteries is at least 90% of the charge capacity of the one or more external rechargeable batteries, and wherein the second period of time is approximately between 5-15 minutes.

20. The method of claim 15, wherein the first pre-determined charge level of the at least one rechargeable charging battery is at least 90% of the charge capacity of the at least one rechargeable charging battery, and wherein the first period of time is approximately between 5-15 minutes.

21. A portable charger device to charge one or more external rechargeable batteries, the device comprising:
   a first housing having a chamber to hold at least one rechargeable charging battery; and
   at least one controller configured to:
      determine a first charging current level to apply to the at least one rechargeable charging battery such that the at least one rechargeable charging battery achieves a first pre-determined charge that is reached within a first period of time of 15 minutes or less;
      determine a second charging current to apply to the one or more external rechargeable batteries; and
      a first DC-DC converter under control of the at least controller to cause application of the first charging current substantially equal to the determined first charging current level charge to the at least one rechargeable charging battery;
   a second DC-DC converter under control of the at least controller that receives charge from the at least one rechargeable charging battery in the chamber and delivers the charge to one or more external rechargeable batteries to cause application of the second charging current substantially equal to the determined second charging current level.

22. The portable charger device of claim 21 wherein the first housing comprises:
   a mechanism to attach and detach the first housing from a second housing that contains the first DC-DC converter.

23. The portable charger device of claim 21 wherein the first housing further comprises:
   a mechanism to attach and detach the one or more external rechargeable batteries.

24. The portable charger device of claim 21 wherein the first DC-DC converter is controlled by the controller and the second DC-DC converter is controlled by a second, different controller.

25. The portable charger device of claim 24, wherein the second DC-DC conversion module is part of a power conversion module configured to convert an external power supply voltage level to a charging voltage level to be applied to the at least one rechargeable charging battery.

26. The portable charger device of claim 25 wherein the power conversion module includes at least one of: an AC-DC power conversion module and a DC input DC-DC power conversion module.

27. The portable charger device of claim 24 wherein the second housing further includes an interface to couple to the one or more external batteries.

28. The portable charger device of claim 27 wherein the interface is a harness interface.

29. The portable charger device of claim 21 wherein the first pre-determined charge level of the at least one rechargeable charging battery is up to 90% of the charge capacity of the at least one rechargeable charging battery.

* * * * *

UNITED STATES PATENT AND TRADEMARK OFFICE
CERTIFICATE OF CORRECTION

PATENT NO. : 8,368,346 B2
APPLICATION NO. : 11/775995
DATED : February 5, 2013
INVENTOR(S) : David C. Batson et al.

Page 1 of 1

It is certified that error appears in the above-identified patent and that said Letters Patent is hereby corrected as shown below:

Column 19

Line 59, delete "hosing" and insert --housing--

Signed and Sealed this
Ninth Day of April, 2013

Teresa Stanek Rea
*Acting Director of the United States Patent and Trademark Office*